US010845774B2

(12) United States Patent
Baxi et al.

(10) Patent No.: US 10,845,774 B2
(45) Date of Patent: Nov. 24, 2020

(54) COOKING DEVICE OPERABLE TO SENSE AN INGREDIENT CHARACTERISTIC AND A COOKING ENVIRONMENT

(71) Applicant: SmartyPans Inc., Farmingdale, NY (US)

(72) Inventors: Rahul Baxi, Oakland, CA (US); Prachi Baxi, Oakland, CA (US)

(73) Assignee: SmartyPlans, Inc., San Mateo, CA (US)

( * ) Notice: Subject to any disclaimer, the term of this patent is extended or adjusted under 35 U.S.C. 154(b) by 826 days.

(21) Appl. No.: 14/738,347

(22) Filed: Jun. 12, 2015

(65) Prior Publication Data

US 2016/0066744 A1    Mar. 10, 2016

Related U.S. Application Data

(60) Provisional application No. 62/011,454, filed on Jun. 12, 2014.

(51) Int. Cl.
*A47J 36/32*    (2006.01)
*A47J 37/10*    (2006.01)
*G05B 19/048*   (2006.01)

(52) U.S. Cl.
CPC .......... *G05B 19/048* (2013.01); *A47J 36/321* (2018.08); *G05B 2219/2643* (2013.01)

(58) Field of Classification Search
CPC . A47J 36/32; A47J 37/10–108; G05B 19/048; G05B 2219/2643
USPC .......... 99/342, 331–335, 343–344, 422–423; 426/523
See application file for complete search history.

(56) References Cited

U.S. PATENT DOCUMENTS

| 4,875,533 | A | 10/1989 | Mihara et al. | |
|---|---|---|---|---|
| 6,549,818 | B1 | 4/2003 | Ali | |
| 6,578,469 | B2 | 6/2003 | Sharpe | |
| 6,813,575 | B2 | 11/2004 | Laflamme | |
| 6,946,632 | B2 * | 9/2005 | Shon | H05B 6/6411 |
| | | | | 177/256 |
| 7,487,714 | B2 * | 2/2009 | Andoh | A21B 3/04 |
| | | | | 219/401 |
| 8,191,465 | B2 | 6/2012 | Sager et al. | |
| 9,119,501 | B2 * | 9/2015 | Xie | A47J 36/32 |
| 9,439,530 | B2 * | 9/2016 | Logan | A47J 27/62 |
| 10,025,282 | B1 * | 7/2018 | Wilkinson | G05B 19/042 |
| 2001/0032546 | A1 * | 10/2001 | Sharpe | A47J 37/10 |
| | | | | 99/331 |
| 2004/0016348 | A1 * | 1/2004 | Sharpe | A47J 37/10 |
| | | | | 99/331 |
| 2006/0274814 | A1 | 12/2006 | Wang | |

(Continued)

FOREIGN PATENT DOCUMENTS

WO    2014/009280 A3    1/2014

*Primary Examiner* — Michael A Laflame, Jr.
(74) *Attorney, Agent, or Firm* — Barclay Damon LLP

(57) ABSTRACT

A cooking device includes, in one embodiment, a body and a cooking surface. The body defines a cavity. One or more sensors are located within the cavity. The cooking device also includes a processor operable with the one or more sensors to sense an ingredient characteristic with respect to an ingredient that has been deposited onto the cooking surface. The processor is also operable with the one or more processors to sense a cooking environment during the cooking of the meal.

21 Claims, 26 Drawing Sheets

(56) References Cited

U.S. PATENT DOCUMENTS

| | | | |
|---|---|---|---|
| 2007/0108182 A1* | 5/2007 | Lee | H05B 6/6464 |
| | | | 219/400 |
| 2011/0253693 A1* | 10/2011 | Lyons | A47J 27/00 |
| | | | 219/209 |
| 2012/0000903 A1* | 1/2012 | Baarman | A47J 27/002 |
| | | | 219/620 |
| 2014/0170275 A1 | 6/2014 | Bordin | |
| 2015/0208845 A1* | 7/2015 | Robbins | A47J 45/068 |
| | | | 206/459.1 |
| 2015/0208858 A1* | 7/2015 | Robbins | A47J 45/068 |
| | | | 426/231 |
| 2016/0051078 A1* | 2/2016 | Jenkins | F24C 3/12 |
| | | | 99/331 |

* cited by examiner

COOKING DEVICE OPERABLE TO SENSE AN INGREDIENT CHARACTERISTIC AND A COOKING ENVIRONMENT

CROSS-REFERENCE TO RELATED APPLICATION

This application is a non-provisional of, and claims the benefit and priority of, U.S. Provisional Patent Application No. 62/011,454, filed on Jun. 12, 2014. The entire contents of such application are hereby incorporated by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyrights whatsoever.

BACKGROUND

There is a known electronic pan having a sensor. The sensor senses the temperature of the pan or food in the pan. The pan's handle has indicators which indicate the food temperature and food doneness. The pan also generates an audible alarm to inform the user of food doneness.

There are several disadvantages of this known pan. First, this known pan is not designed to be wirelessly coupled to a mobile device or computer for receiving recipe data. Second, its sensor does not assist the user with depositing the proper amount of ingredients into the pan according to recipe data. As a result, the user must undergo the extra time and labor of using measuring cups to deposit the proper amount of ingredients. Third, this known pan does not provide information updates throughout the cooking process or at the end of the cooking process based on changing cooking variables.

The foregoing background describes some, but not necessarily all, of the problems, disadvantages and shortcomings related to cooking devices.

SUMMARY

In an embodiment, the cooking device includes: (a) a base; (b) a cooking surface coupled to the base so that there is a cavity between the base and the cooking surface; (c) a battery supported by the base; (d) a plurality of sensors comprising (i) an ingredient characteristic sensor housed within the cavity; and (ii) a cooking environment sensor housed within the cavity; (e) a data processor operably coupled to the sensors, wherein the data processor is operable with the sensors to: (i) receive recipe data associated with a recipe, wherein the recipe data comprises an ingredient associated with an ingredient weight, and wherein the ingredient is divisible into a plurality of ingredient portions; (ii) sense a weight on the cooking surface while the ingredient portions are gradually deposited onto the cooking surface, wherein the weight increases as more ingredient portions are deposited onto the cooking surface; (iii) generate a finish output after the sensed weight reaches the ingredient weight; (iv) sense a cooking environment factor while the ingredient is being cooked, wherein the cooking environment factor is variable during cooking; (v) generate a cooking remaining time, wherein the cooking remaining time varies depending, at least partially, upon the sensed cooking environment factor; and (vi) generate meal data after the cooking remaining time ends, wherein the meal data depends, at least partially, upon the sensed cooking environment factor; and (f) an antenna supported by the base, wherein the antenna is operably coupled to the data processor, and the antenna is configured to communicate signals associated with the recipe data, the finish output, the cooking remaining time and the meal data.

In an embodiment, the cooking devices is operable with, or includes, a cooking interface system operably coupled to the data processor. The cooking interface system comprising a plurality of computer-readable instructions which are executable to control a display device so as to: (a) display a plurality of recipe images associated with a plurality of different recipes; (b) display an ingredient deposit image associated with a selected one of the recipe images; (c) display an ingredient deposit progress image; (d) when a first amount of the ingredient portions is deposited onto the cooking surface, cause the ingredient deposit progress image to indicate a first amount of progress toward depositing all of the ingredient portions; (e) when a second amount of the ingredient portions is deposited onto the cooking surface, cause the ingredient deposit progress image to indicate a second amount of progress toward depositing all of the ingredient portions; (f) during cooking, graphically indicate whether the cooking environment factor satisfies a designated cooking condition; (g) repeat step (f) after the cooking environment factor changes during the cooking; (h) graphically indicate the cooking remaining time during the cooking; (i) graphically indicate when the cooking remaining time is depleted; and (j) graphically indicate meal data after the cooking remaining time is depleted.

In an embodiment, the cooking device includes: (a) a body comprising a cooking surface, wherein the body defines a cavity located below the cooking surface; (b) a plurality of sensors comprising: (i) an ingredient factor sensor positioned within the cavity; and (ii) a cooking environment sensor positioned within the cavity; (c) an electronic element operably coupled to the sensors, wherein the electronic element is operable with the sensors to: (i) receive recipe data associated with a recipe, wherein the recipe data comprises an ingredient associated with an ingredient factor, wherein the ingredient is divisible into a plurality of ingredient portions; (ii) determine whether the ingredient factor is being satisfied while the ingredient portions are incrementally deposited onto the cooking surface; (iii) generate a finish output after the ingredient factor has been satisfied; (iv) sense a cooking environment factor while the ingredient is being cooked; and (v) generate a cooking remaining time.

In an embodiment, the electronic cooking device includes: (a) a pan body comprising a cooking surface, wherein the pan body defines a pan body cavity located below the cooking surface; (b) a sensor positioned within the pan body cavity; (c) a handle coupled to the pan body, wherein the handle defines a handle cavity; (d) memory device or data storage device positioned within the handle cavity, wherein the memory or data storage device stores a plurality of instructions; and (e) a processor positioned within the handle cavity, wherein the processor is configured to operate with the sensor and execute the instructions to: (i) receive recipe requirements for a meal comprising at least one ingredient; (ii) determine whether the at least one ingredient which has been deposited onto the cooking surface, satisfies the recipe requirements; and (iii) generate an alert during cooking of the meal, wherein the alert prompts a change in a cooking environment to satisfy the recipe requirements.

Additional features and advantages of the present disclosure are described in, and will be apparent from, the following Brief Description of the Drawings and Detailed Description.

DETAILED DESCRIPTION

Referring to FIGS. 1-13, the cooking system or cooking device 10 includes, in one embodiment: (a) a pan body or body 12; (b) a grasp or handle 14 attached to the pan body 12 through use of a handle fastener 16, such as a screw or bolt; and (c) a cover or lid (not shown) sized and shaped to fit onto the pan body 12 to cover and define a cooking chamber.

Figure 1:
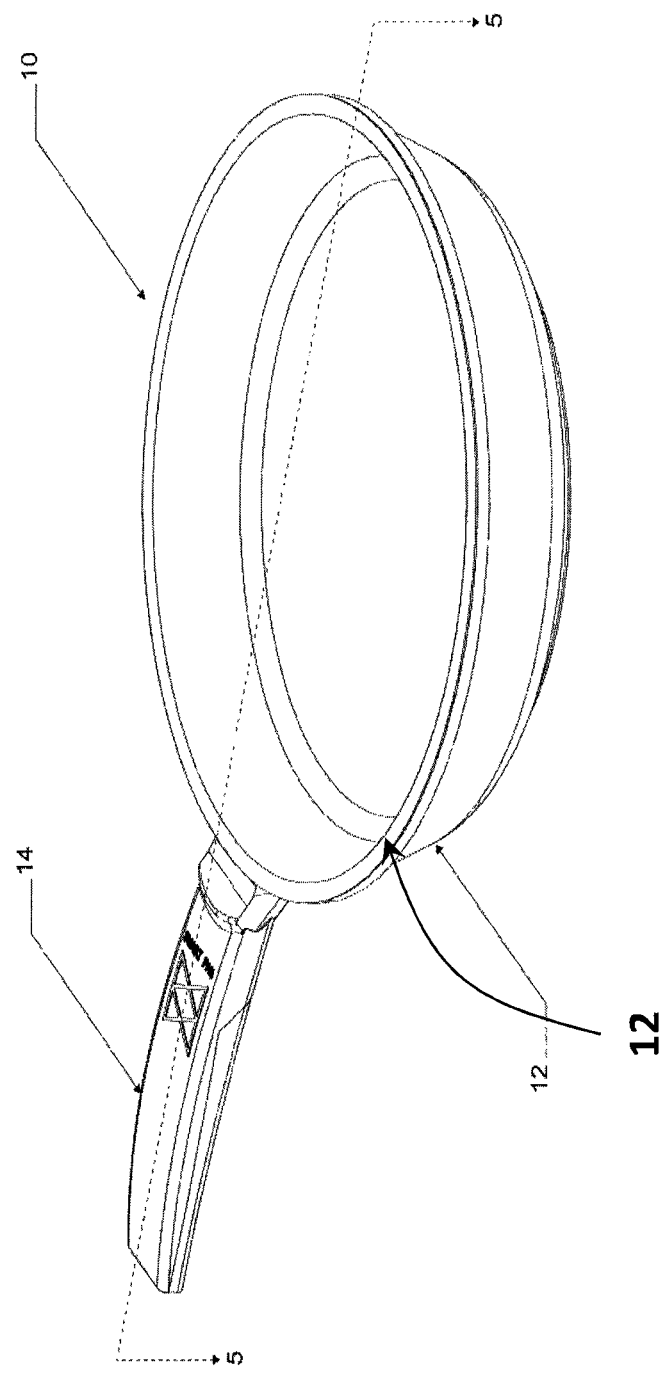
FIG. 1 is an isometric view of an embodiment of the cooking device.
Figure 2:
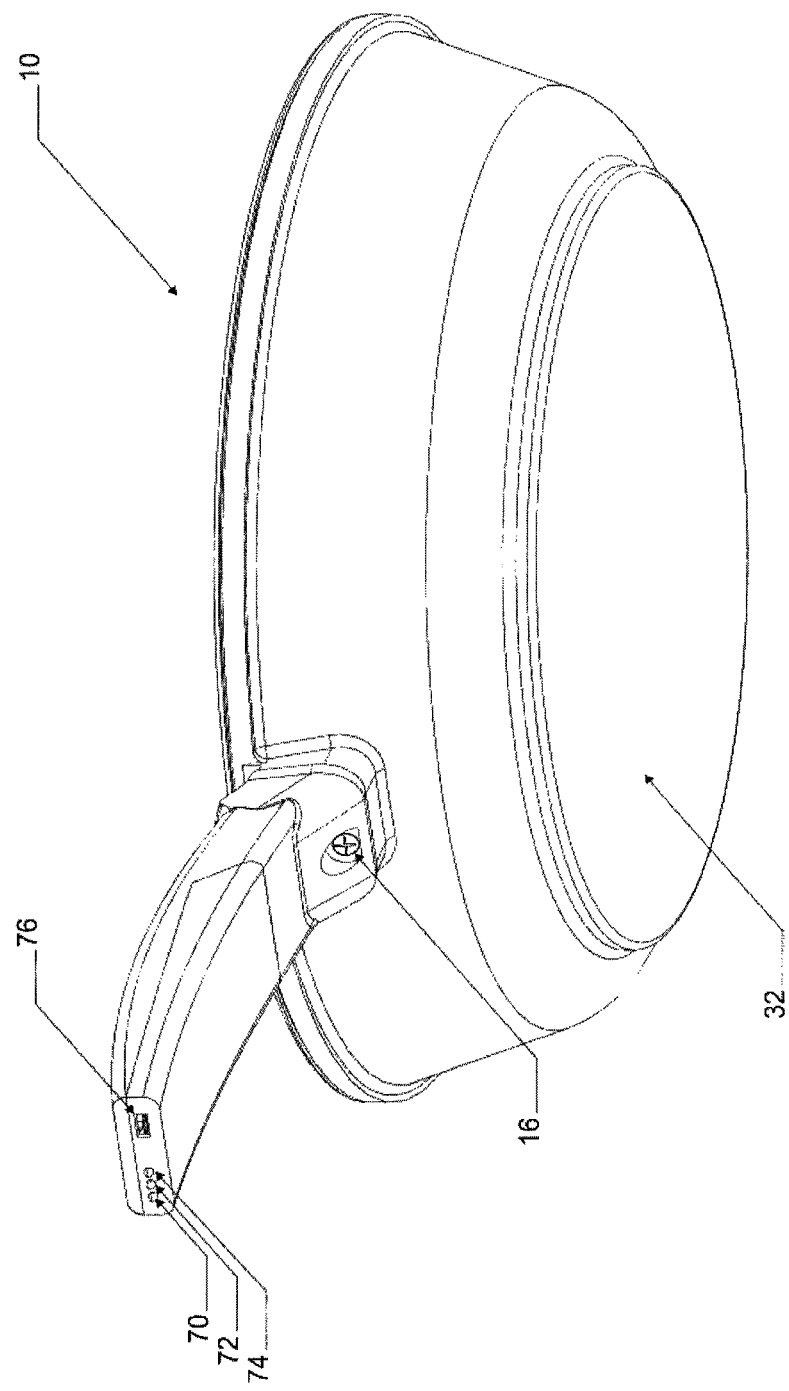
FIG. 2 is another isometric view of the cooking device of FIG. 1.
Figure 3:
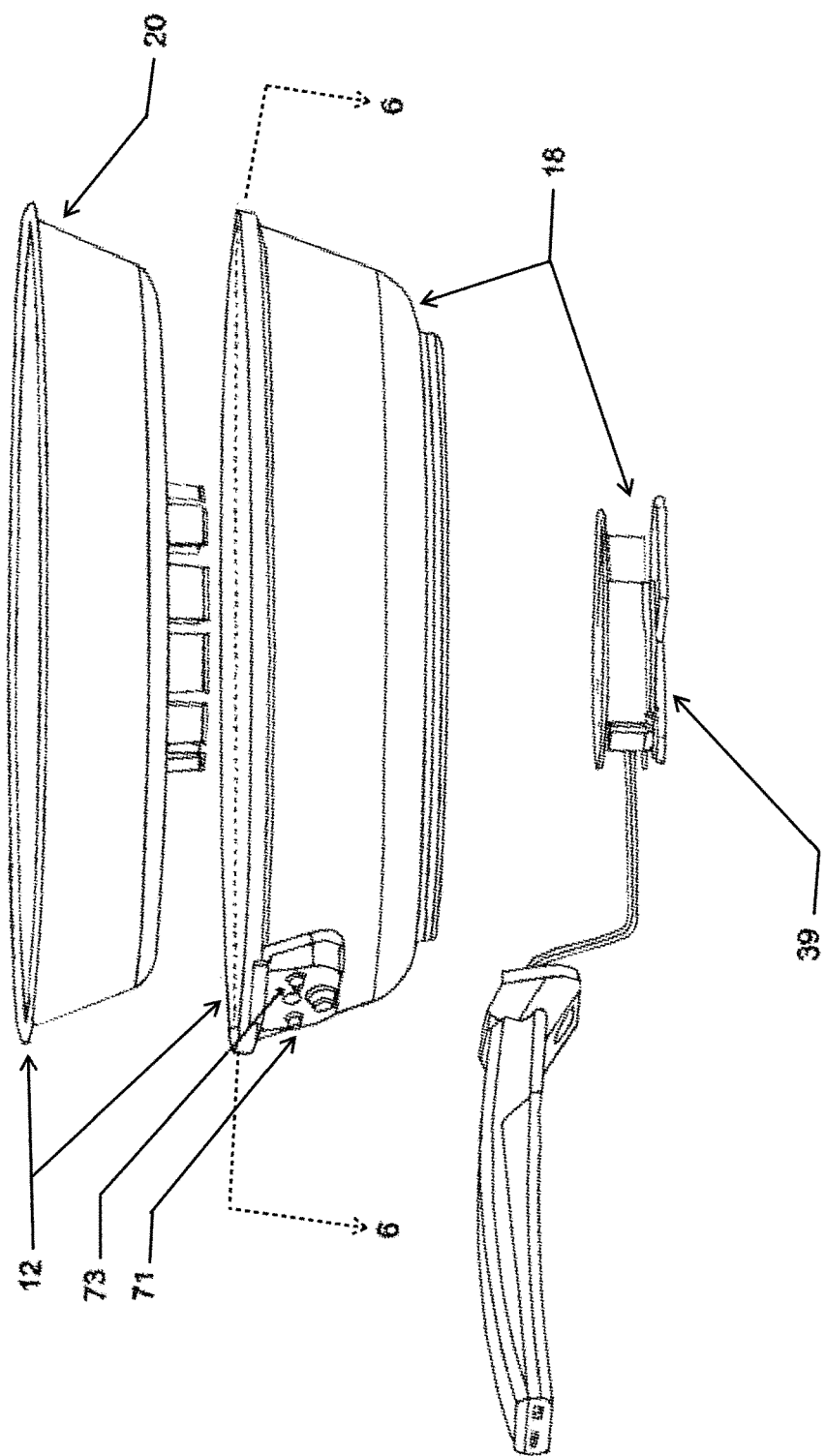
FIG. 3 is an exploded, isometric view of the cooking device of FIG. 1.
Figure 4:
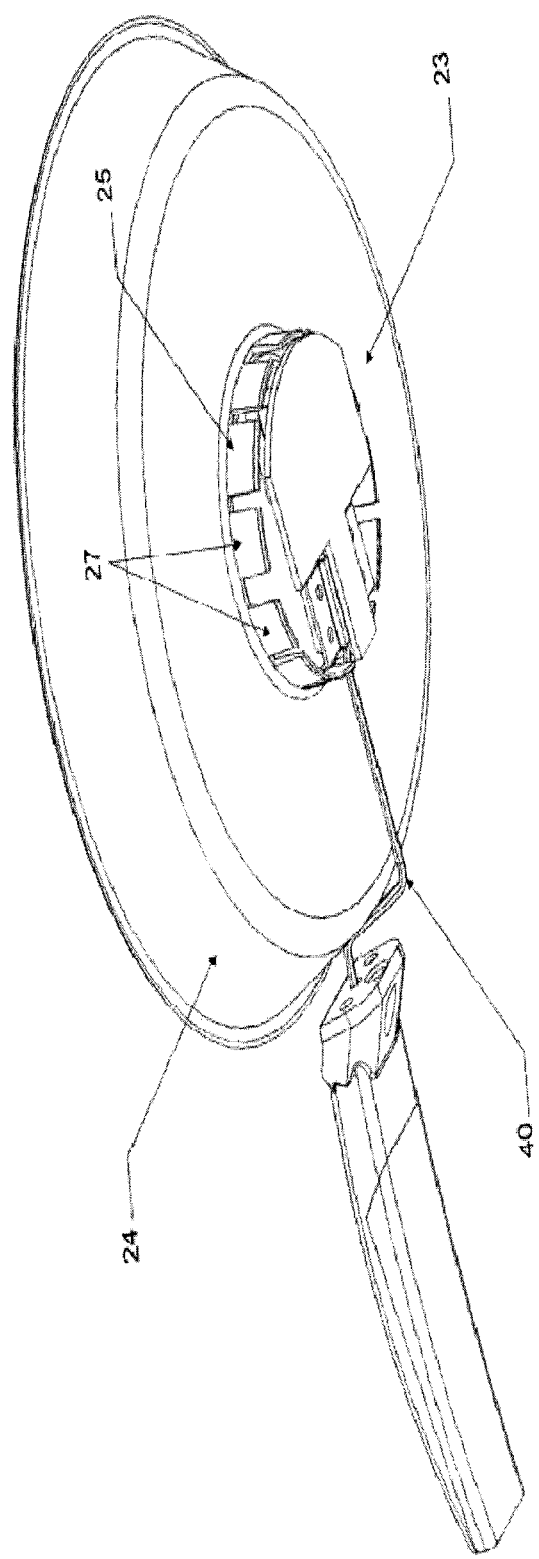
FIG. 4 is a bottom, isometric view of an embodiment of the cooking container of the cooking device of FIG. 1.
Figure 5:
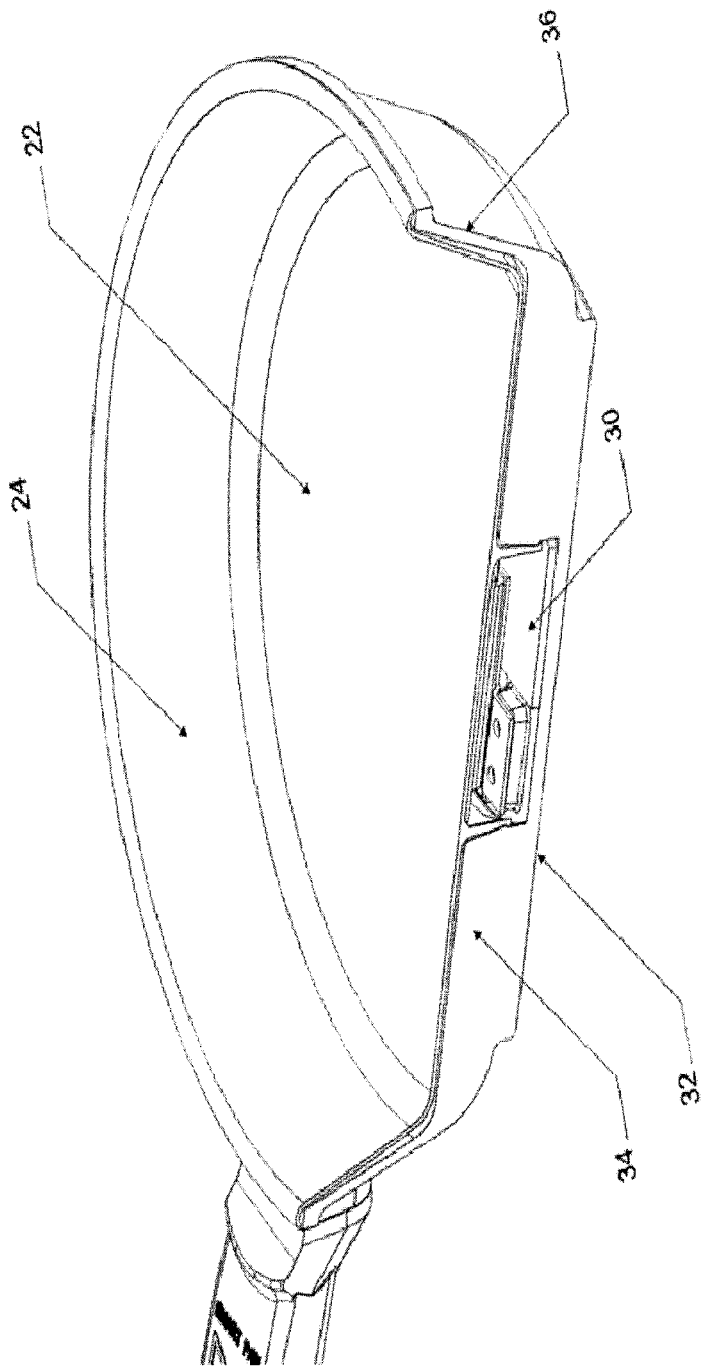
FIG. 5 is a cross-sectional view of the cooking device of FIG. 1, taken substantially along line 5-5.

In an embodiment illustrated in FIGS. 3-5, the body 12 includes: (a) a base 18; and (b) a cooking container 20 having a cooking surface 22, a bottom surface 23, a cooking container side wall 24 extending upward from the cooking surface 22, and a neck 25. The neck 25 has a plurality of spaced-apart fingers or tabs 27.

Figure 6:
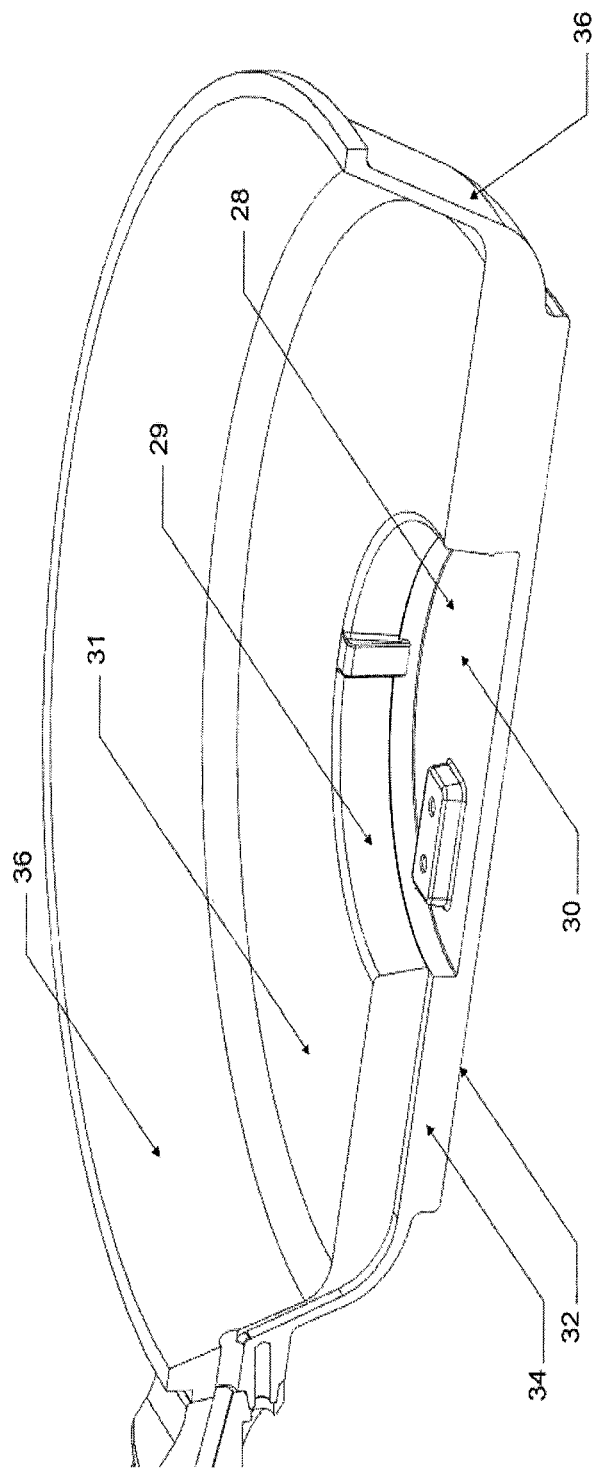
FIG. 6 is a cross-sectional view of the cooking device of FIG. 3, taken substantially along line 6-6.
Figure 7:
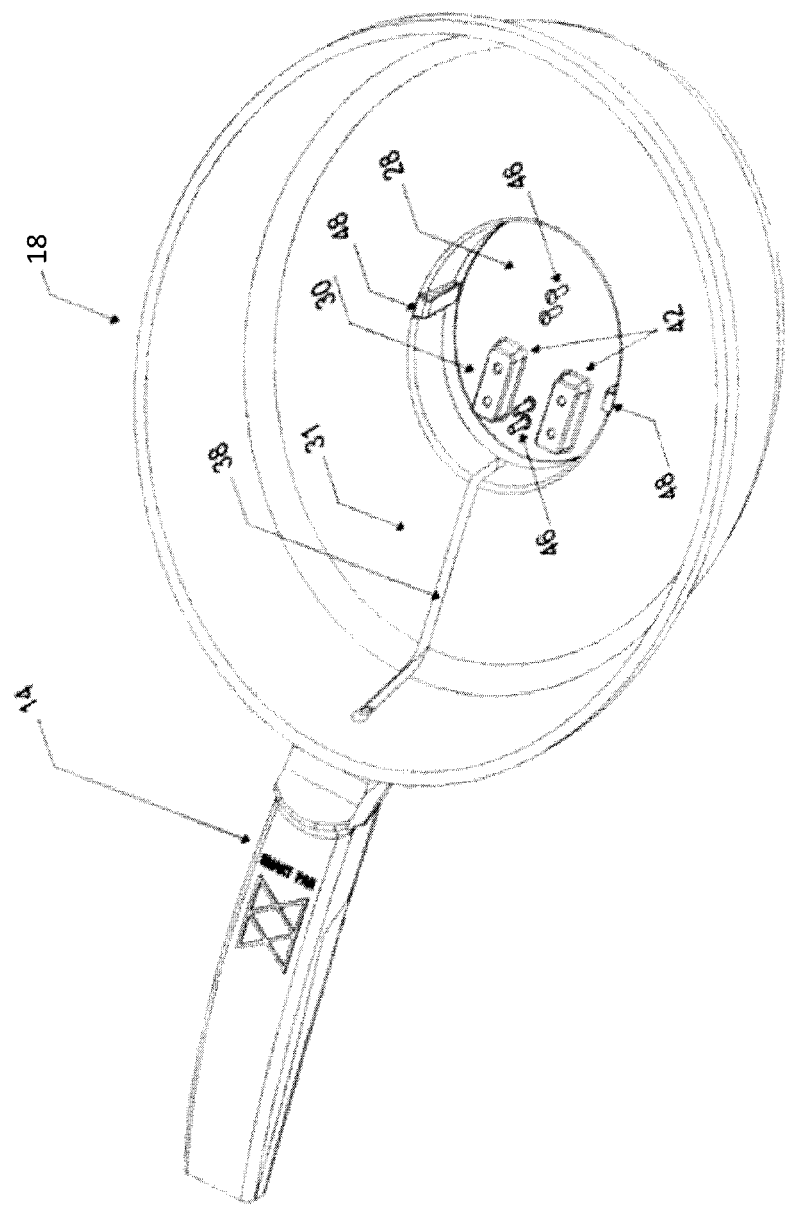
FIG. 7 is an isometric view of the cooking device of FIG. 1, illustrating an embodiment of the base.
Figure 8:
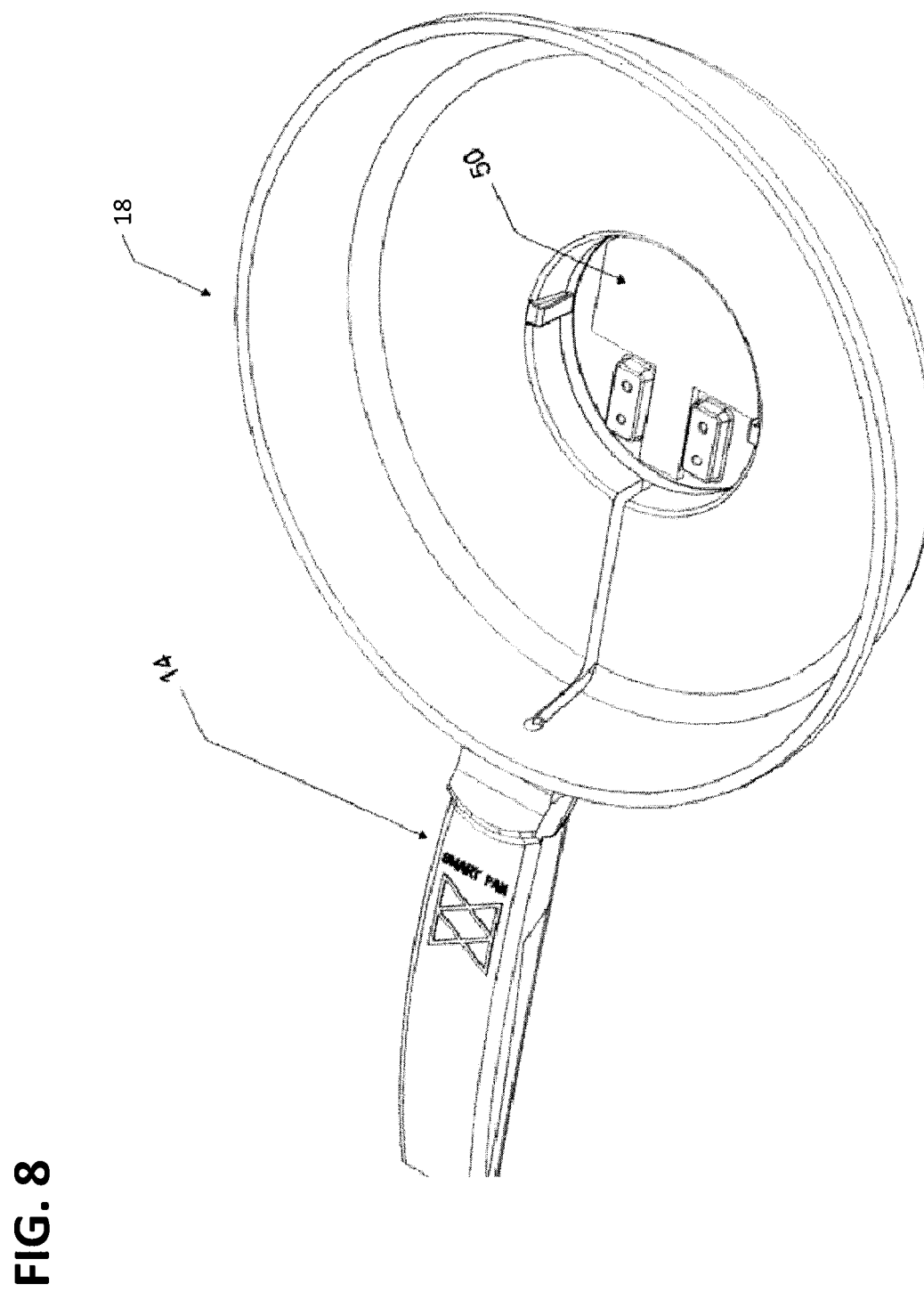
FIG. 8 is an isometric view of the cooking device of FIG. 1, illustrating an embodiment of the bottom heat shield.
Figure 9:
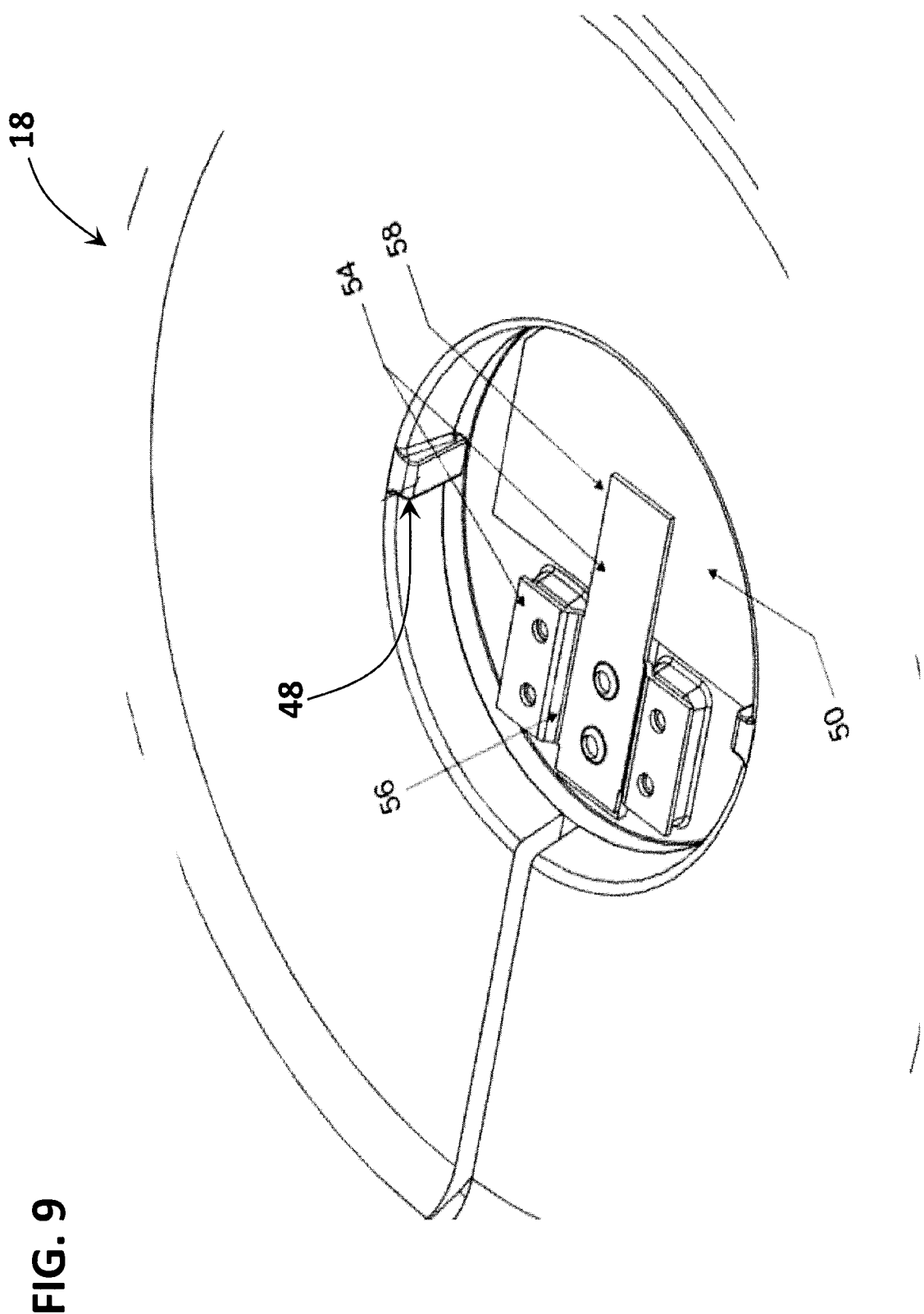
FIG. 9 is an enlarged, isometric view of the cooking device of FIG. 1, illustrating an embodiment of the weight sensor support.
Figure 10:
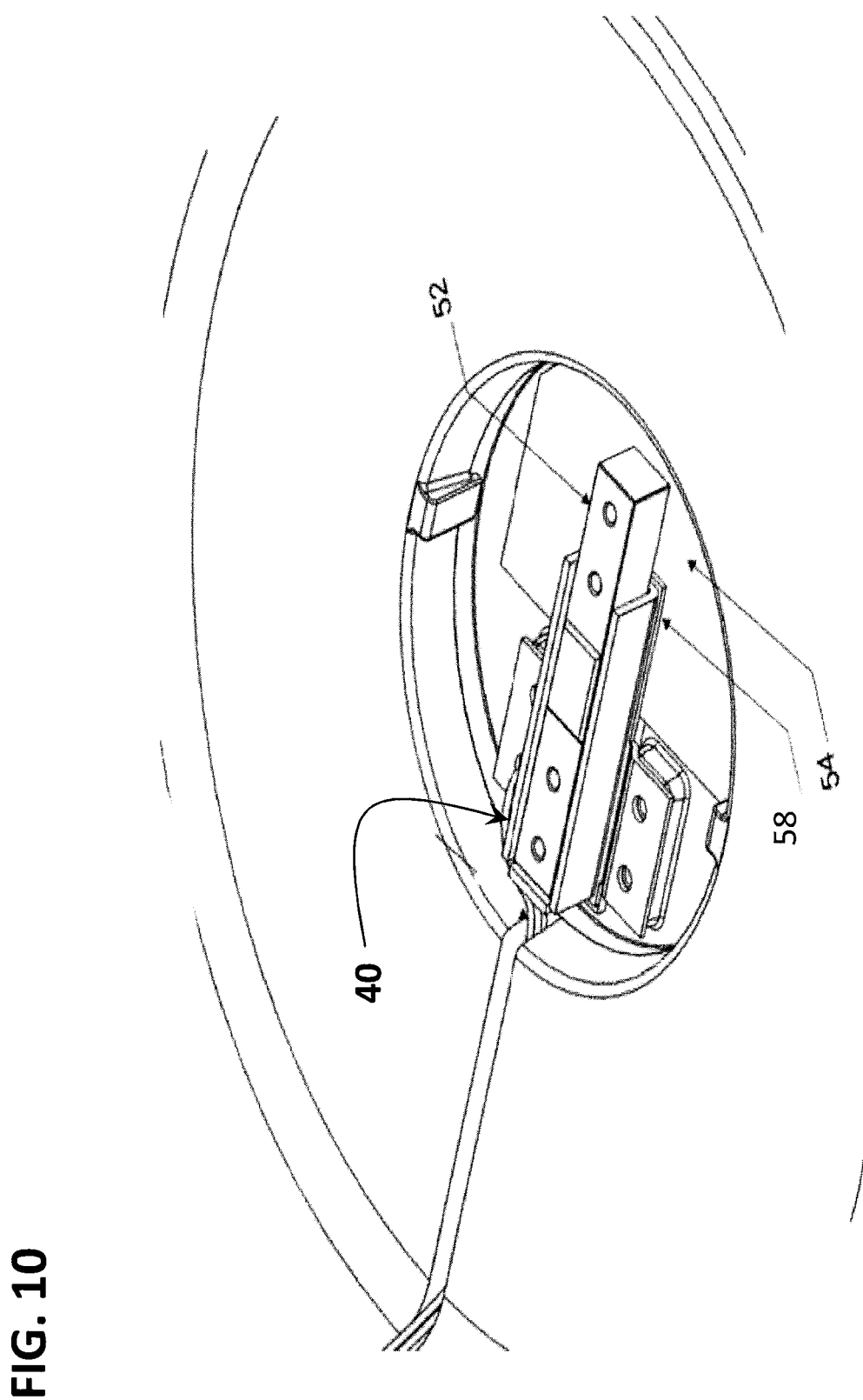
FIG. 10 is an enlarged, isometric view of the cooking device of FIG. 1, illustrating an embodiment of the weight sensor.
Figure 11:
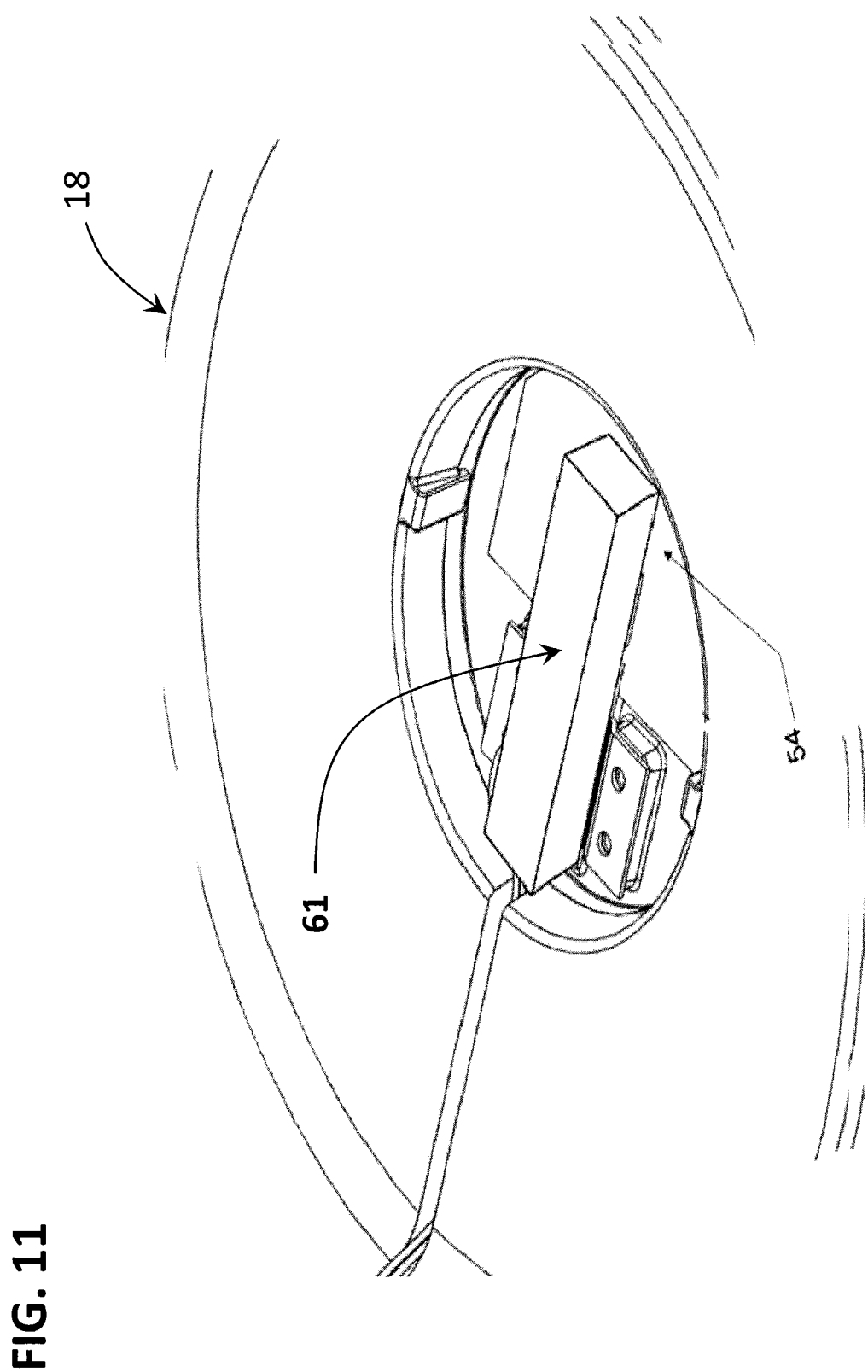
FIG. 11 is an enlarged, isometric view of the cooking device of FIG. 1, illustrating an embodiment of the top heat shield.
Figure 12:
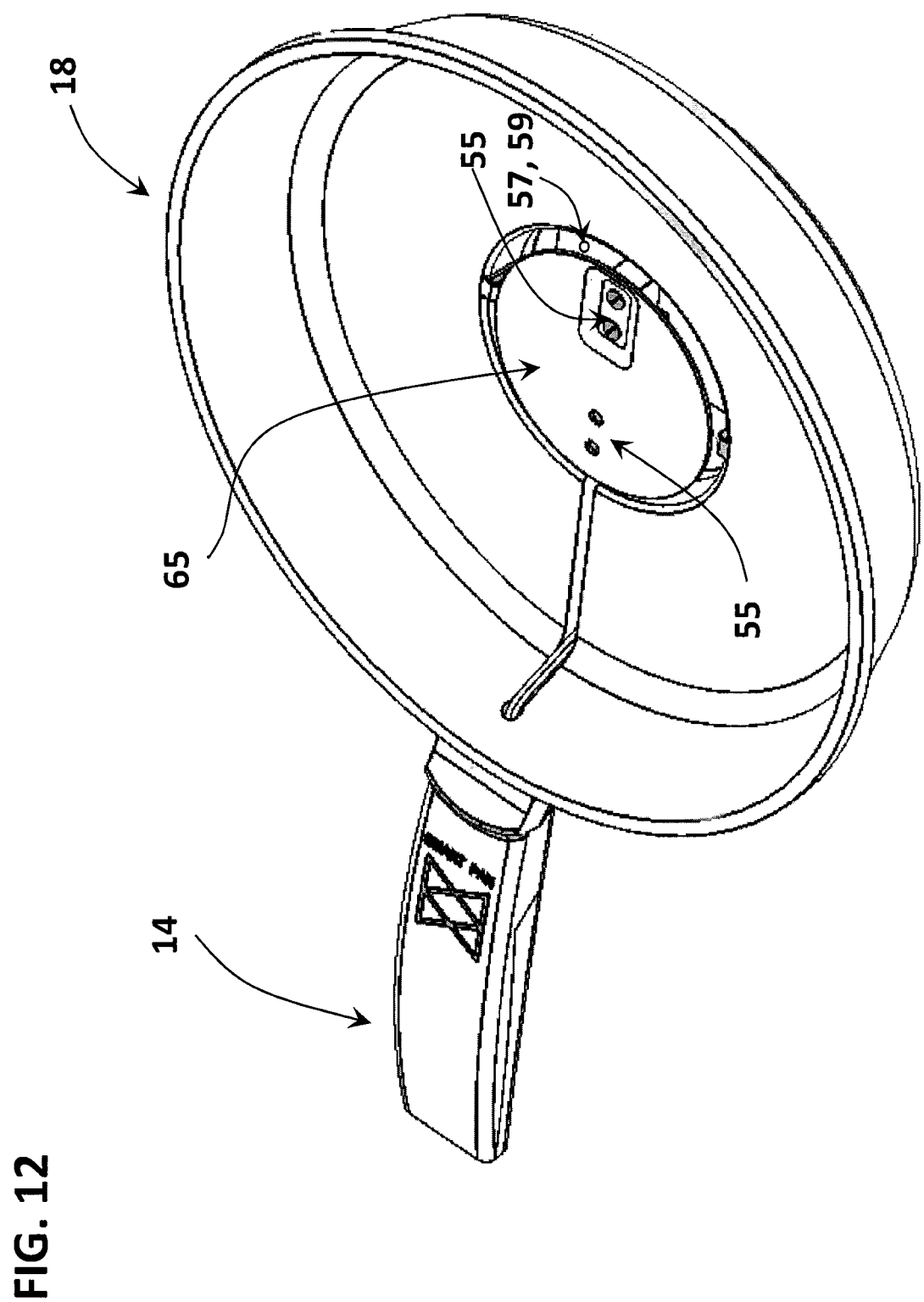
FIG. 12 is an isometric view of the cooking device of FIG. 1, illustrating an embodiment of the weight interface.

Referring to FIG. 5-6, the base 18 includes: (a) a base step or intermediate floor 31 having an inner vertical wall 29 and a subfloor 28 which collectively define a sensor space, sensor recess or sensor cavity 30; (b) a base bottom 32 located below, and spaced apart from, the intermediate floor 31 so as to define a base cavity 34; (c) a base side wall 36 extending upward from the base bottom 32; and (d) a sensor assembly 39 housed and located within the sensor cavity 30. The intermediate floor 31 defines a cable slot or cable channel 38 sized to receive the electrical cable 40 as illustrated in FIGS. 4 and 7.

As illustrated in FIGS. 3 and 7-12, in an embodiment, the sensor assembly 39 includes: (a) a plurality of spaced-part standoffs 42 coupled to the subfloor 28 through fasteners 44, such as screws or bolts; (b) a plurality of fasteners 46, such as screws or bolts, secured to the subfloor 28; (c) a plurality of cooking container engagers 48 attached to opposite sides of the vertical wall 26, wherein the container engagers 48 are configured to mate or interlock with the tabs 27, such as in a snap-fit fashion; (d) a bottom insulator or bottom heat shield 50 having a fiberglass composition to prevent, minimize or decrease the amount of heat transferred from the heat source (e.g., stovetop) to the ingredient characteristic sensor, such as a load sensor or weight sensor 52; (e) a T-shaped weight sensor support 54 having a valley section 56 connected to the standoffs 42 and another section 58 which partially overlays the bottom heat shield 50; (f) the weight sensor 52 which overlays the weight sensor support 54; (g) a top insulator or top heat shield 61 providing a full or partial enclosure surrounding the weight sensor 52, such as the illustrated, box-shaped heat shield housing having a ceramic composition; (h) a weight interface 65, such as the illustrated disk, attached to the weight sensor 52 using the fasteners 55; and (i) a temperature sensor 57 having a wire or cable (not shown) connected to a probe end 59 in physical contact with the bottom surface 23 of the cooking container 20.

In an embodiment, the top heat shield 61, due to its ceramic properties, shields heat radiation and shields solar energy. The combined shielding provided by the top heat shield 61 and bottom heat shield 50 protects the weight sensor 52 from heat damage when the cooking device 10 is subject to relatively high heat levels, such as levels over 500° F., levels over 1,000° F. or levels over 2,000° F.

In an embodiment, the weight sensor 52 includes a load cell. In an embodiment, the load cell includes a transducer operable to generate an electrical signal whose magnitude is directly proportional to the force being measured. Depending upon the embodiment, the load cell can include a strain gauge load cell, a hydraulic load cell or a pneumatic load cell.

In an embodiment, the temperature sensor 57 includes a thermocouple. In such embodiment, the thermocouple includes a plurality of different conductors or semiconductors. The different conductors or semiconductors contact each other at one or more spots, where a temperature differential is experienced by the different conductors or semiconductors. This differential produces a voltage when the temperature of one of the spots differs from the reference temperature at other parts of the circuit.

In an embodiment illustrated in FIG. 3, the cooking device 10 includes a humidity sensor 51 having a humidity probe mounted to the inside of the pan body 12 or to the lid 53 of the cooking device 10. Depending upon the embodiment, the cooking device can include a plurality of different types of sensors (including, but not limited to, food ingredient characteristic sensors), operable to sense a plurality of different cooking-related conditions, such as food chemistry or taste, food moisture, food color, food size, food shape, food weight, food temperature, smoke, burning of food, food odor, cooking sounds, cooking time and other cooking-related variables.

Figure 13:
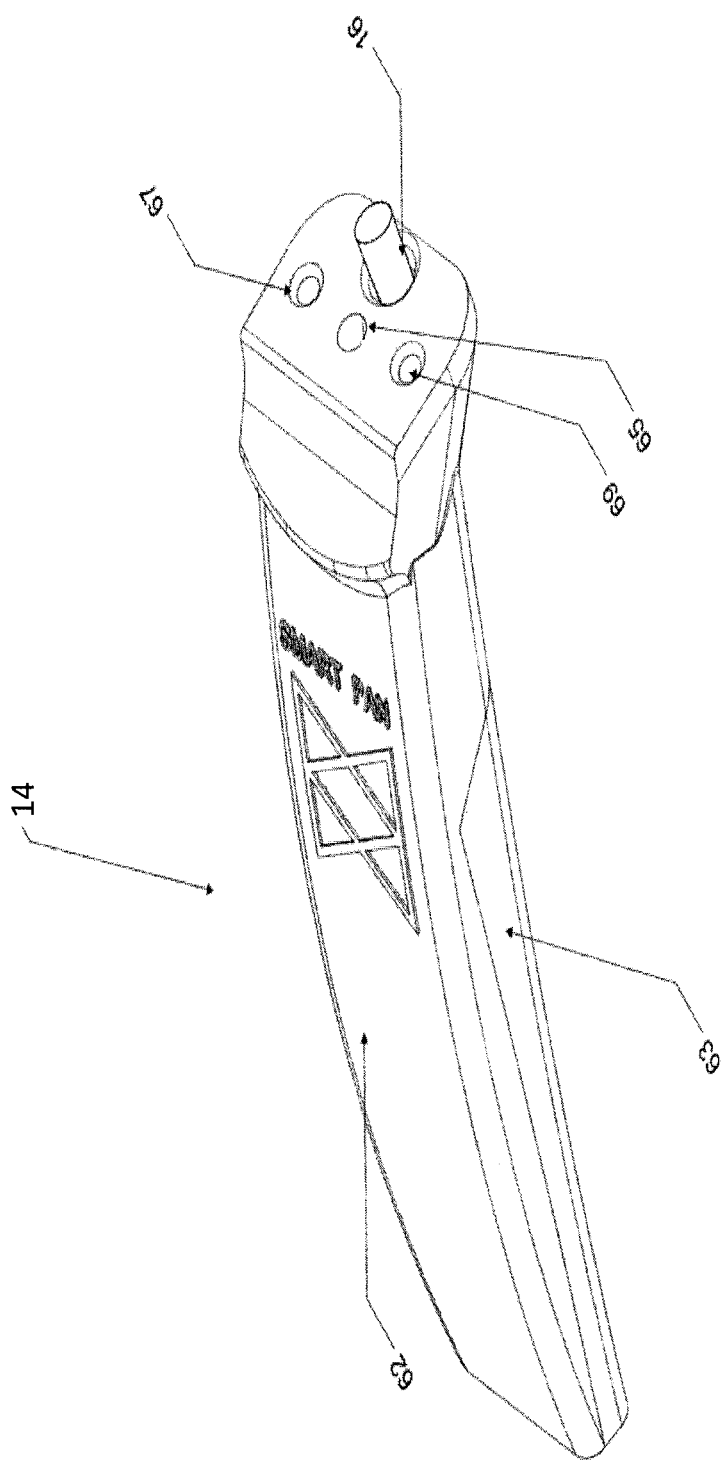
FIG. 13 is an isometric view of an embodiment of the handle of the cooking device.
Figure 14:
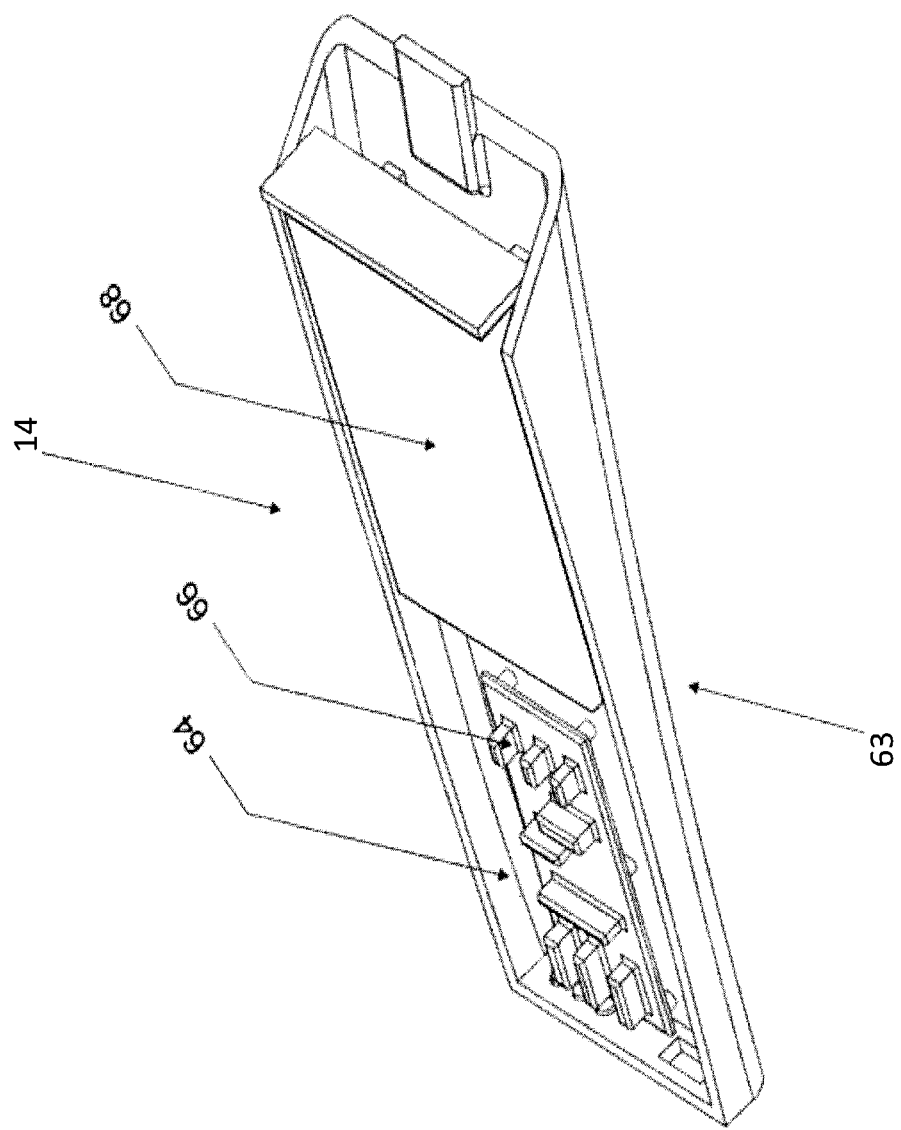
FIG. 14 is an isometric view of an embodiment of the handle of the cooking device, illustrating an embodiment of the electronic elements housed within the handle.

Referring to FIGS. 3 and 13-14, the handle 14 includes: (a) a handle body 62 connected to the base 18 through handle fastener 16 and coupler receivers 67 and 69 configured to receive the couplers or studs 71 and 73, respectively; (b) a cable receiver 65 configured to receive the cable 40; and (c) a handle support or handle platform 63 configured to hold and support the electronic assembly 60. In an embodiment, the handle platform 63 is removeably attached to the handle body 62 in a snap fit fashion.

The electronic assembly 60, in one embodiment, includes: (a) a circuit board, circuitry, electronic component or controller 64 operable to process and manage electronic signals based on logic; (b) a communicator or transceiver 66, such as an antenna, coupled to the controller 64 and operable to send and receive wireless signals, such as radio frequency (RF) signals compatible with the Bluetooth standard or other suitable wireless communications methods, such as infrared signal; (c) a rechargeable, mobile power source, such as the rechargeable battery unit 68, which is operably coupled to the controller 64; (d) the wire, set of wires, cord or cable 40 which operably couples the controller 64 to the weight sensor 52, temperature sensor 57 and other sensors described above; (e) a plurality of different indicators 70, 72 and 74 operably coupled to the controller 64; and (f) an electrical port 76.

Depending upon the embodiment, the controller 64 can include: (a) a microprocessor, data processor, controller or processor; and (b) a data storage device or memory device, such as random access memory, read only memory or a combination thereof.

Referring back to FIG. 2, in an embodiment, the indicators 70, 72 and 74 each include a separate light source, such as a light emitting diode. In one example: (a) general status indicator 70 is green when the cooking device 10 (and its controller 64) is in use, and general status indicator 70 is red when the cooking device 10 has a low or depleted battery charge; (b) sensor X indicator 72 is green when sensor X is in operation and red when sensor X is not in operation; and (c) sensor Y indicator 74 is green when sensor Y is in operation and red when sensor Y is not in operation.

Depending upon the embodiment, the electrical port 76 can be an electrical charge port or a data port which enables both electrical charging and data communication with the controller 64. In an embodiment, the electrical port 76 is a micro USB port enabling a user to recharge the battery unit 68 by inserting a USB cable end into the port 76.

Figure 20:
FIG. 20 is an isometric view of a system or assembly of an embodiment of the cooking device in use as operably coupled to an electronic device having a display device.

Referring to FIG. 14, the controller 64 is programmed to wirelessly communicate with another electronic device 78 (FIG. 20). In an embodiment, the controller 64 is programmed to communicate with the electronic device 78 through a suitable data cable connecting electronic device 78 to port 76. The electronic device 78 can include any electrical device having an input-output device, including, but not limited to, a network-accessible device, an internet access device, a electronic display unit, a mobile device, cell phone, a smartphone, a tablet computer, a laptop computer, a desktop computer, a thin client, a television and a smart television.

In an embodiment, the cooking device 10 excludes any external electrical ports and does not include port 76. In such embodiment, the controller 64 is configured to wirelessly communicate with an external battery recharger. The battery recharger sends a wireless signal to the controller 64 which causes the battery unit 68 to be wirelessly recharged.

In an embodiment, the controller 64 includes a commercially available product marketed as the Atmega328-pu based Arduino MCU micro-controller. The transceiver 66 includes a btm222 Bluetooth module. The battery unit 68 includes a 7.4 v lithium-poly rechargeable battery. The weight sensor 52 monitors weight on the cooking surface 22, the temperature sensor 57 monitors temperature on the cooking surface 22, and other sensors monitor other cooking environmental factors, for example, the humidity sensor monitors humidity in the cooking chamber of the cooking device 10. These sensors interface with the general purpose input output (GPIO) pins of the Atmega328 micro-controller. The btm222 Bluetooth module interfaces with the RX, TX, Vin and Gnd pins of the Atmega328 micro-controller. The whole cooking device 10 is powered by the 7.4 v lithium-polymer battery. The Atmega328 micro-controller has an memory device storing software. The stored software captures inputs from the three GPIO pins interfaced with the sensors. The btm222 Bluetooth module acts as a two way communication bridge between the Atmega328 micro-controller and a cooperating electronic device 78, such as a smartphone. The electronic device 78 sends recipe or cooking-related data and control signals to the Atmega328 micro-controller of the cooking device 10. These data and control signals trigger the sensor reading sub-routines and update the graphical interface of the electronic device 78 accordingly. The cooking software stored on the electronic device 78 uses the sensor values and the central recipe database to guide users in preparing and cooking meals.

In an embodiment, the cooking device 10 is water proof, water resistant or dishwasher safe. In such embodiment, the cooking device 10 includes a plurality of internal liquid seals or gaskets incorporated into the body 12 and handle 14. Also, the cooking device 10 includes a removeable plug or cap sized and shaped to be inserted into or otherwise cover the port 76 to block the entry of liquid into port 76.

Referring to FIGS. 14-26, in an embodiment, the cooking device 10 is operable with, or incorporates, a cooking software system, which includes a cooking software module and a cooking database. In such embodiment, the electronic device 78 stores the cooking software module in its memory device. The cooking software module can be pre-loaded onto the electronic device 78, or the user can store or download the cooking software module onto the electronic device 78. The cooking software database can be stored on a network accessible server, such as a webserver. The cooking software database stores a plurality of different recipe data sets associated with a plurality of different recipes. Each recipe data set has a plurality of tables of data related to ingredient types, ingredient quantity, ingredient volume, ingredient weight, ingredient calories, sequence of combining or mixing ingredients, recipe cooking temperature and recipe cooking time. For example, recipe X may include ingredients such as an onion, green pepper and almond. For each such ingredient, the recipe data set stores one or more ingredient characteristics, such as the weight of such ingredient and the calories per unit weight of each such ingredient.

In addition, the cooking software system stores a plurality of formulas, algorithms or logic to calculate and determine a plurality of cooking variables or cooking factors: (a) one or more cooking environment conditions which can vary during the cooking process, such as temperature of the cooking surface 22 or food being cooked, the humidity in the cooking chamber; (b) the time remaining to complete cooking of the meal being cooked in the cooking device 10; (c) the overall weight of the food on the cooking surface 22; and (d) the total calories, or an approximation of the total calories, of such meal when the cooking has completed. The cooking software system determines each such cooking variable at different intervals throughout the process of cooking the meal. For example, the cooking software system can determine each such factor every fraction of a second (e.g., every two hundred milliseconds), every second, or every five seconds starting at the beginning of the cooking process and ending at the end of the cooking process. In this fashion, the cooking software system continuously and dynamically determines updated cooking factors throughout the cooking process.

The logic for determining the cooking remaining time and total calories depends on variables, such as the variable temperature and the user's deviation from the recipe instructions. For example, if the user increases the temperature, the logic takes this into account to determine a decrease in the cooking remaining time. In another example, if the user the recipe calls for three ounces of almond bits, and the user adds five ounces of almond bits, the logic takes this into account to determine an increase in the calories of the meal based on the extra almond bits.

The following provides an example operation of one embodiment of the cooking device 10 cooperating with the cooking software system:

Step 1: Activation

Using the cooking software module, the user functionally and wirelessly connects the cooking device 10 to the electronic device 78. In doing so, the cooking software system causes the electronic device 78 to produce a plurality of different graphical user interfaces 79 as illustrated in FIGS. 15-26.

Step 2: Pre-Cook Mode—Meal Selection

Figure 15:
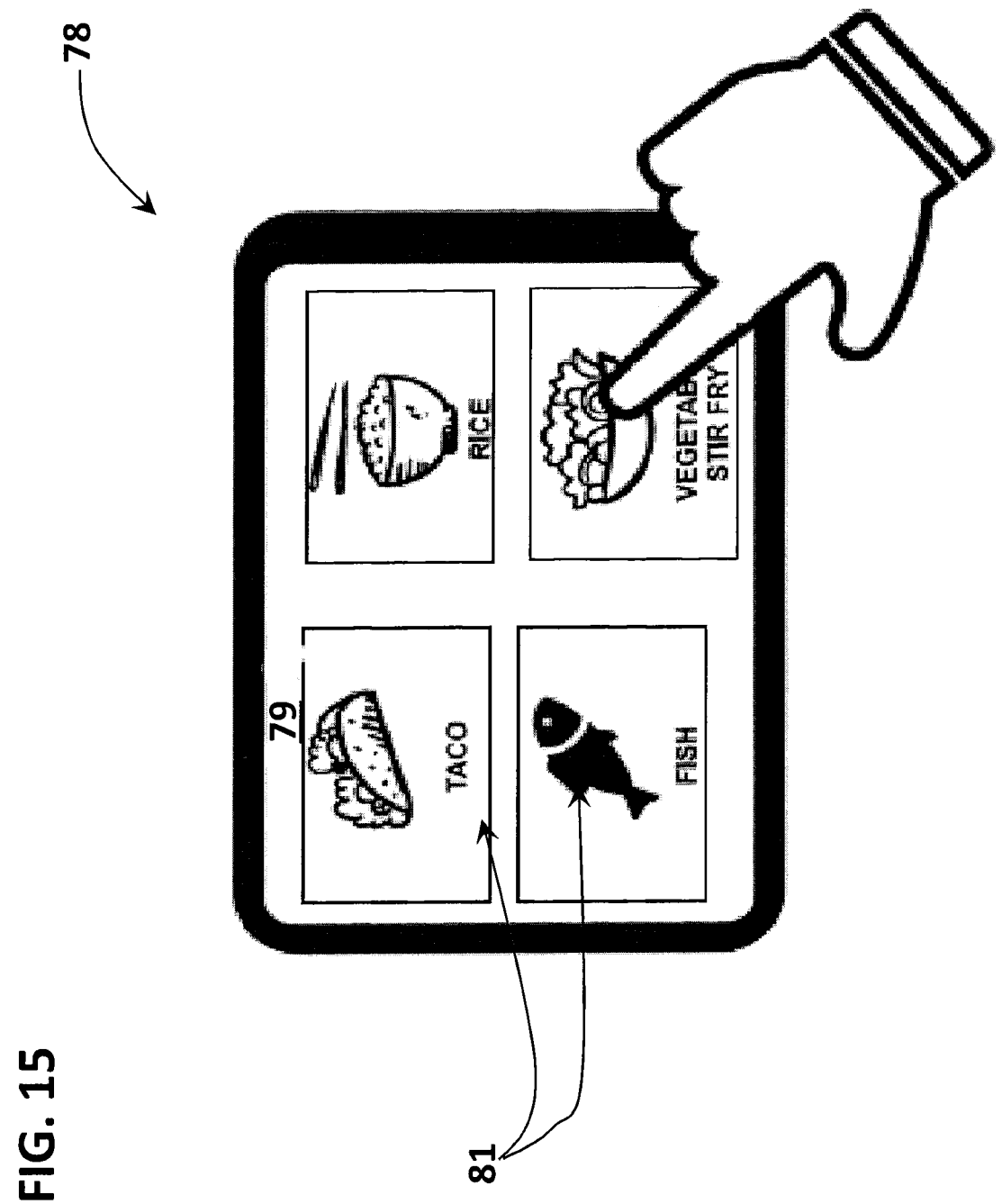
FIG. 15 is a front view of an embodiment of an electronic device operable with the cooking device, illustrating an example of a recipe selection interface.

Executing the cooking software module, the electronic device 78 displays a plurality of different meal icons or meal images 81 during the pre-cook mode. The user can scroll up or down to select a desired meal image as illustrated in FIG. 15. After selecting a desired meal image, the software module causes the electronic device 78 to display the recipe X for the meal X corresponding to the selected meal image.

Step 3: Pre-Cook Mode—Preparing Ingredients

Figure 16:
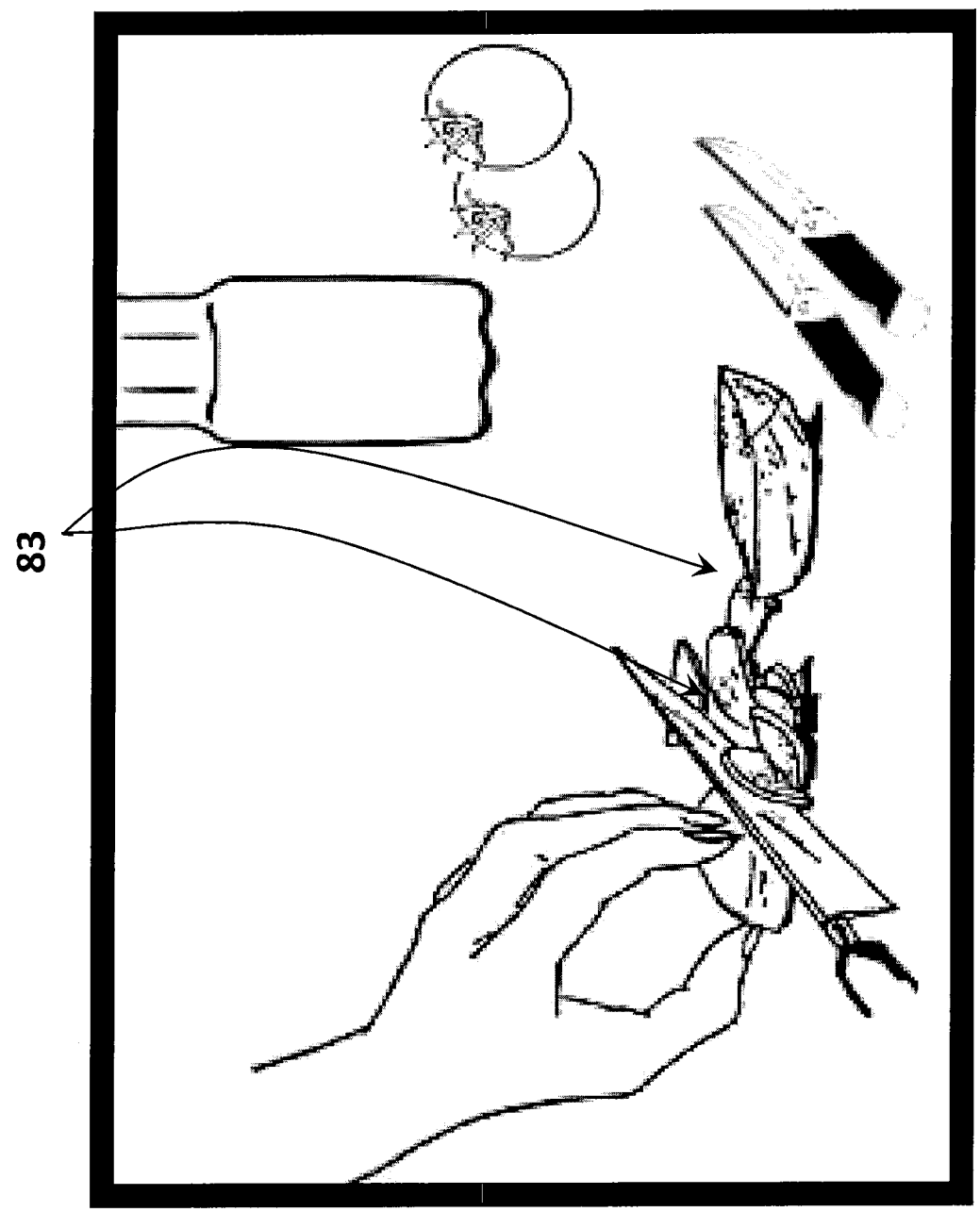
FIG. 16 is an isometric view of an example of ingredient portions which can be deposited into the cooking device.

Referring to FIG. 16, in this step of the pre-cook mode, the user cuts, chops or otherwise collects the ingredient portions 83 for each ingredient of the recipe. For example, the user may chop a pepper into chunks as illustrated in FIG. 16, or the use may obtain a can or bottle of pre-chopped almonds, that is, almond bits. In this example, the pepper chunks would be considered ingredient portions of the pepper ingredient, and the almond bits would be considered ingredient portions of the almond ingredient.

Step 4: Pre-Cook Mode—Measuring Ingredients

Figure 17:
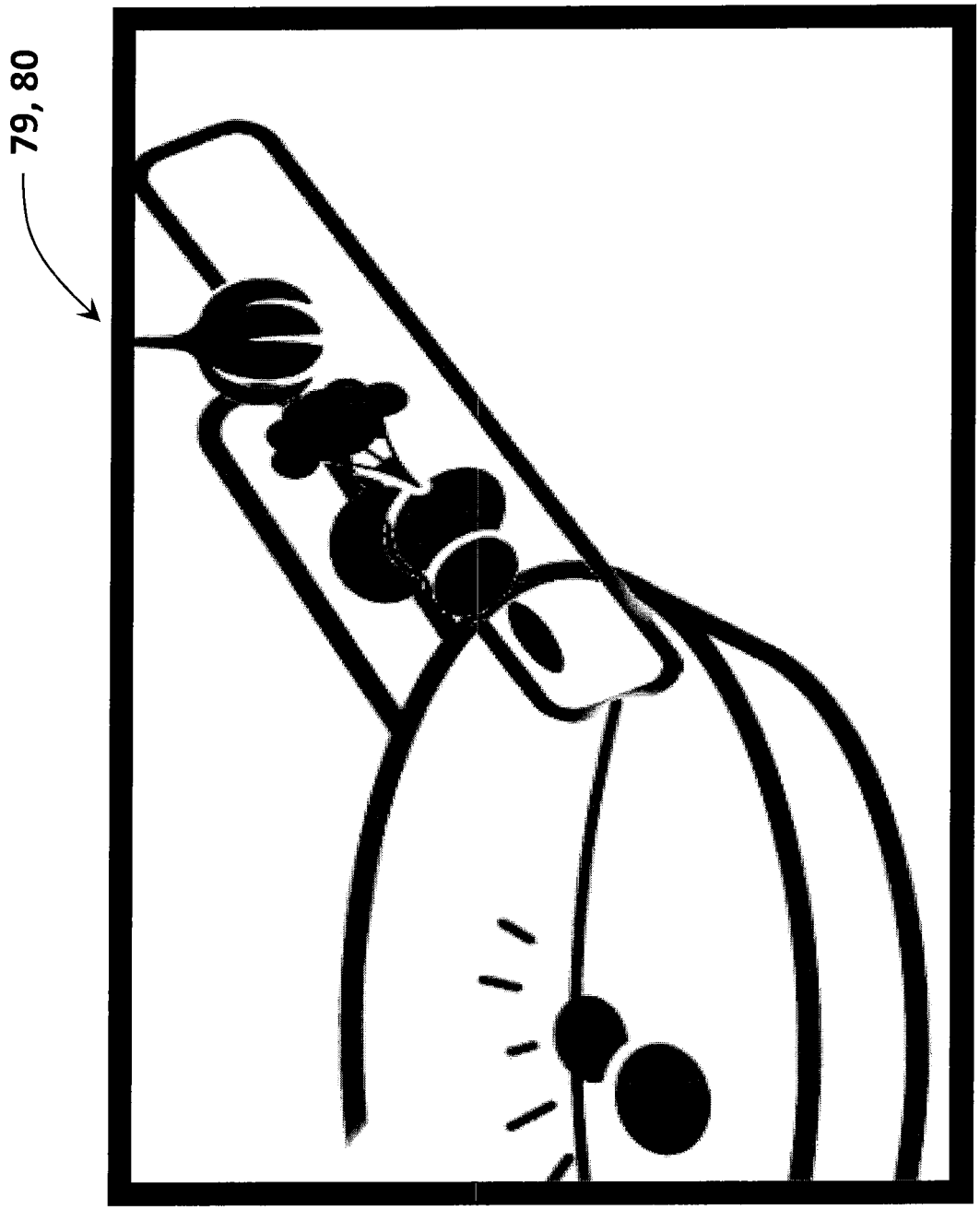
FIG. 17 is a front view of an example of a graphical interface of the electronic device of FIG. 15, illustrating the prompting of depositing ingredient portions into the cooking device.
Figure 18:
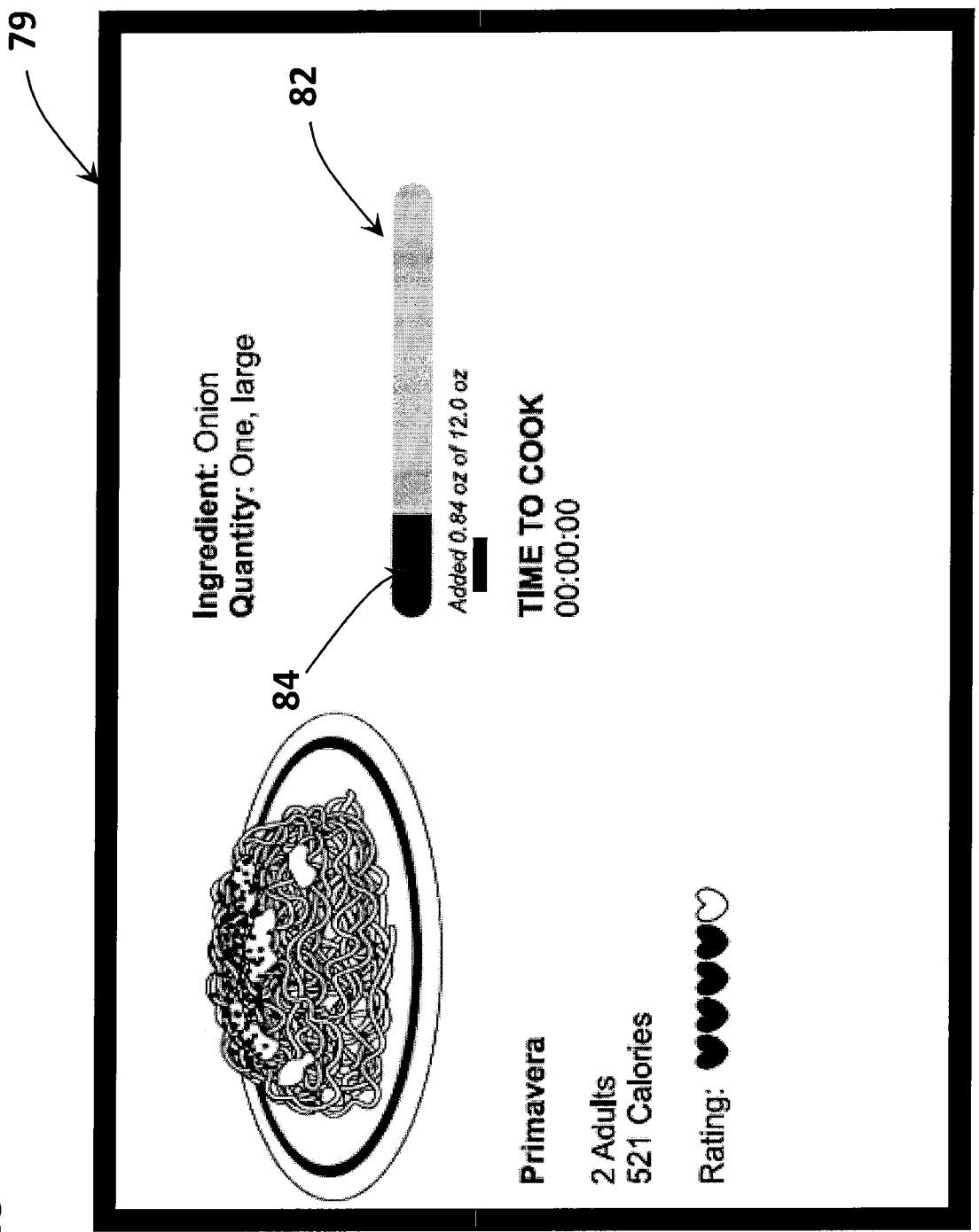
FIG. 18 is a front view of an example of a graphical interface of the electronic device of FIG. 15, illustrating an embodiment of the ingredient deposit progress indicator.

In this step of the pre-cook mode, the cooking device 10 assists the user in measuring the ingredients for the recipe. For example, recipe X may require one-half cup of chopped green pepper and one-fourth cup of almond bits. The cooking software module causes the display of an ingredient deposit image 80, as illustrated in FIG. 17, representing the pouring or sliding of the applicable ingredient portions into the cooking device 10. In the example shown in FIG. 17, the deposit image 80 represents the sliding of onion ingredient portions or onion slices into the cooking device 10. Following this prompt, the user begins to pour onion slices into cooking device 10. This eliminates the burdensome need to use measuring cups. Rather, the user can pour, drop or otherwise deposit the applicable ingredient portions into the cooking device 10 when prompted to do so.

Figure 19:
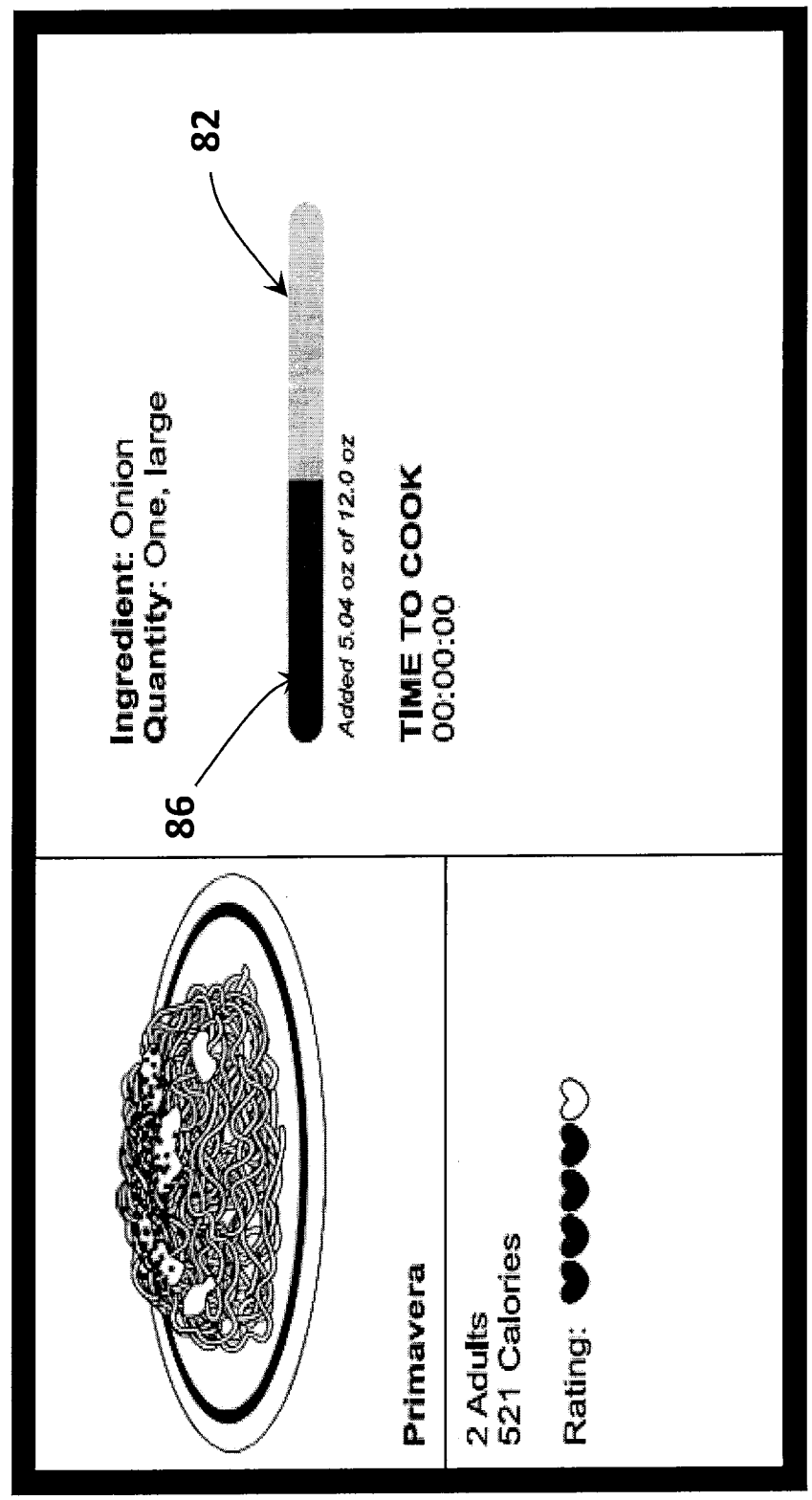
FIG. 19 is a front view of an example of a graphical interface of the electronic device of FIG. 15, illustrating an embodiment of the ingredient deposit progress indicator having progressed further than that illustrated in FIG. 18.

During the depositing process for each ingredient, the weight sensor 52 senses or detects the weight applied by such ingredient to the cooking surface 22. In the example illustrated in FIGS. 18-19, recipe X requires 12.0 ounces of onion. While the user drops a first amount of onion slices into the cooking device 10, the weight sensor 52 senses the weight of the first amount, illustrated as 0.84 ounces in FIG. 18. To indicate the progress toward completing the required onion deposit, the cooking software module causes the ingredient deposit progress bar 82 to indicate partial, incremental movement 84 toward completion. As the user continues pouring an additional amount of the onion slices, the progress bar 82 indicates further movement 86 toward completion as illustrated in FIG. 19. This same process repeats for each of the different ingredients required by recipe X.

Step 5: Cook Mode

Figure 21:
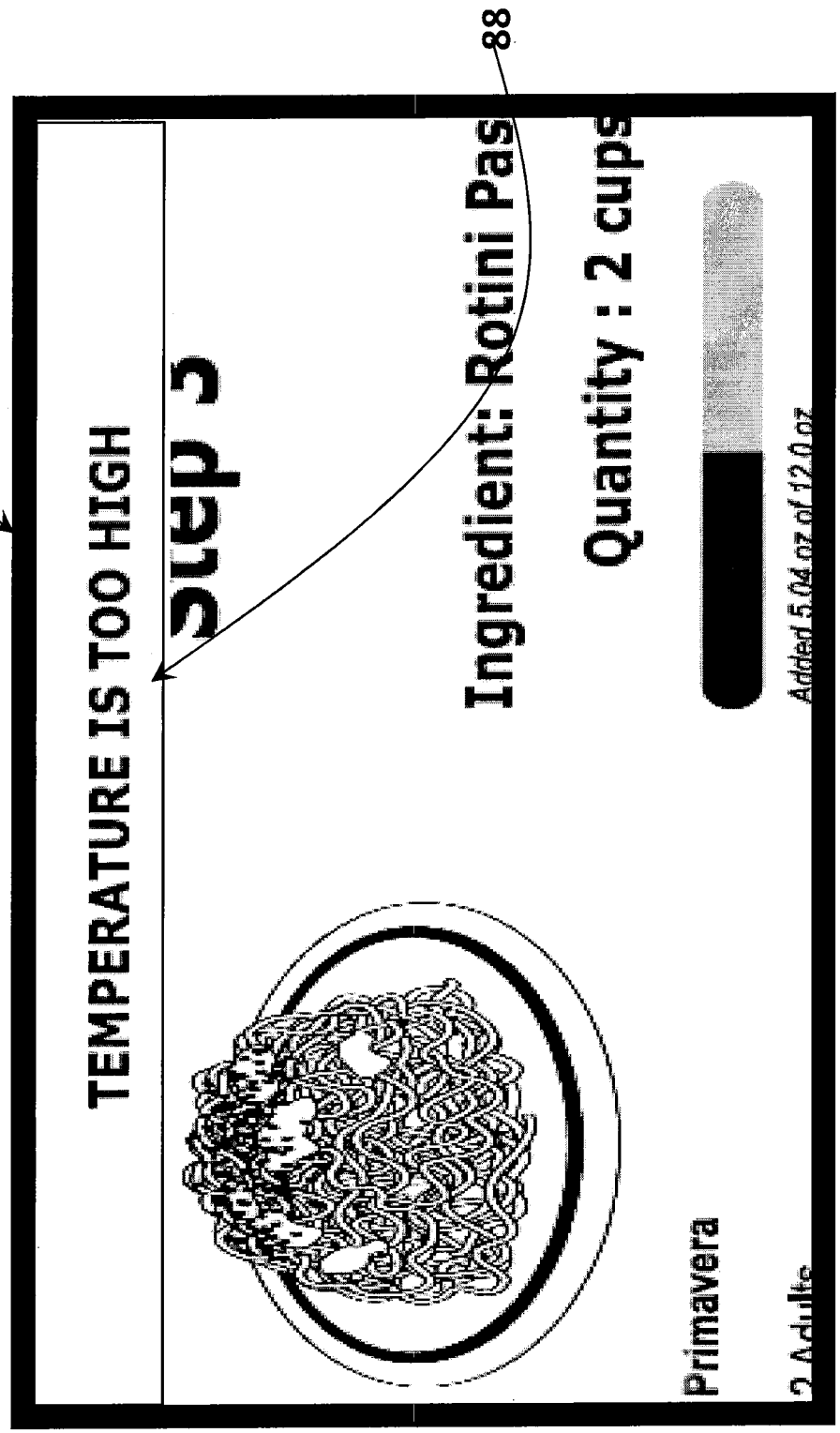
FIG. 21 is a front view of an example of a graphical interface of the electronic device of FIG. 15, illustrating an embodiment of the temperature feedback indicator showing an alert of overheating.
Figure 22:
FIG. 22 is an isometric view of an example of a stove knob being adjusted during the cooking process.

When the user completes adding all of the ingredients into the cooking device 10, the cook mode begins, and user cooks the meal as illustrated in FIG. 20. As described above, based on signals received from the sensors (including, but not limited to, the weight and temperature sensors 52 and 57, respectively) the software cooking system displays a temperature indicator image 88 as illustrated in FIG. 21. The temperature indicator image 88 can display an alert such as "temperature is too high," or "temperature is too low," or the image 88 can display the temperature of the cooking surface 22, such as "90° C." or "187° F." As described above, the software cooking system monitors the temperature of the cooking surface 22, through use of the temperature sensor 57, throughout the cooking process. If the user unintentionally overheats the meal, the software cooking system alerts the user of this so that the user may then reduce the heat such as by turning the stovetop knob 90 as illustrated in FIG. 22.

Figure 23:
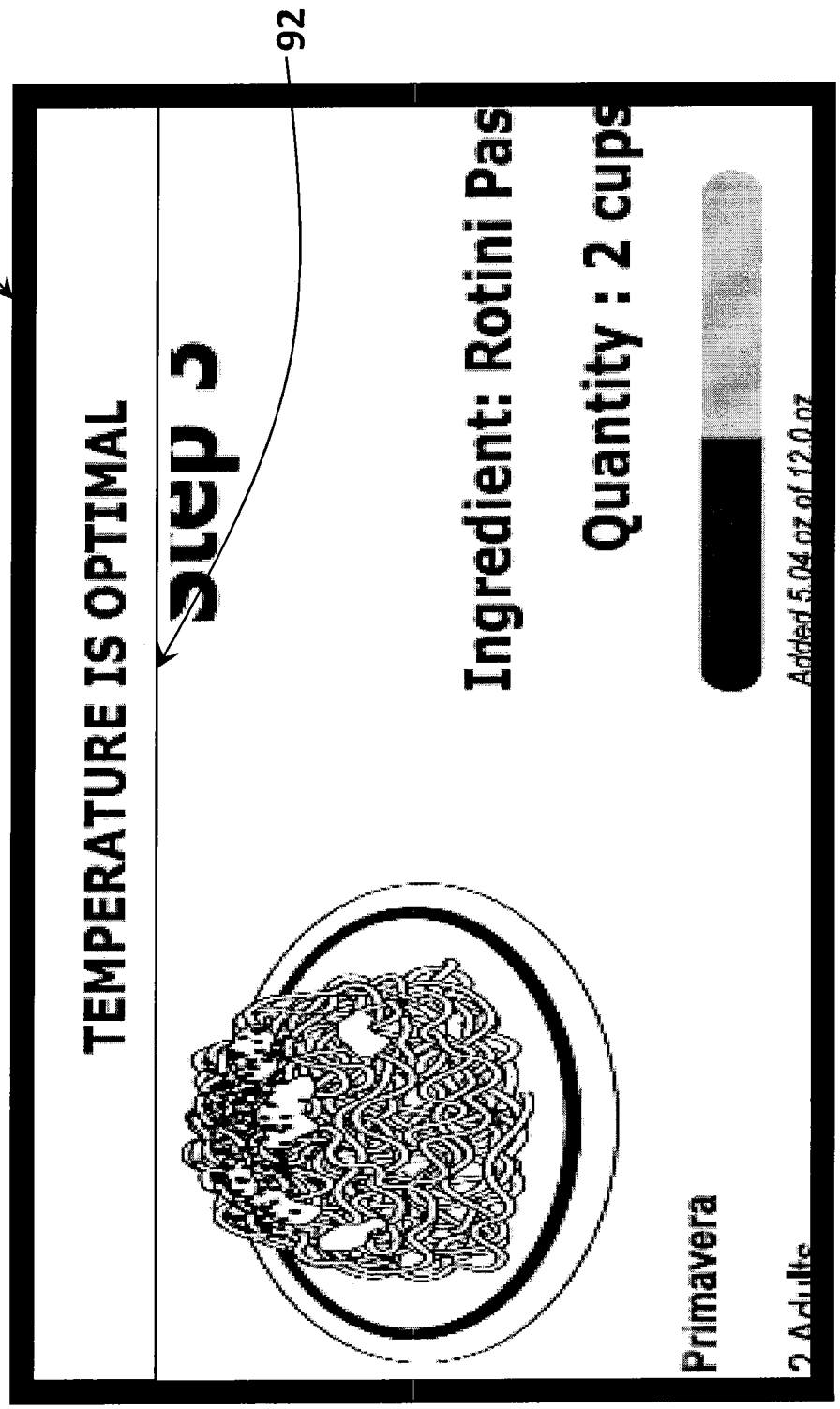
FIG. 23 is a front view of an example of a graphical interface of the electronic device of FIG. 15, illustrating an embodiment of the temperature feedback indicator showing an alert of suitable or optimal temperature.

If the stovetop heat is suitable or otherwise consistent with the applicable recipe data set, the software cooking system displays a temperature indicator image 92 as illustrated in FIG. 23. The temperature indicator image 92 can display an alert such as "temperature is optimal."

Figure 24:
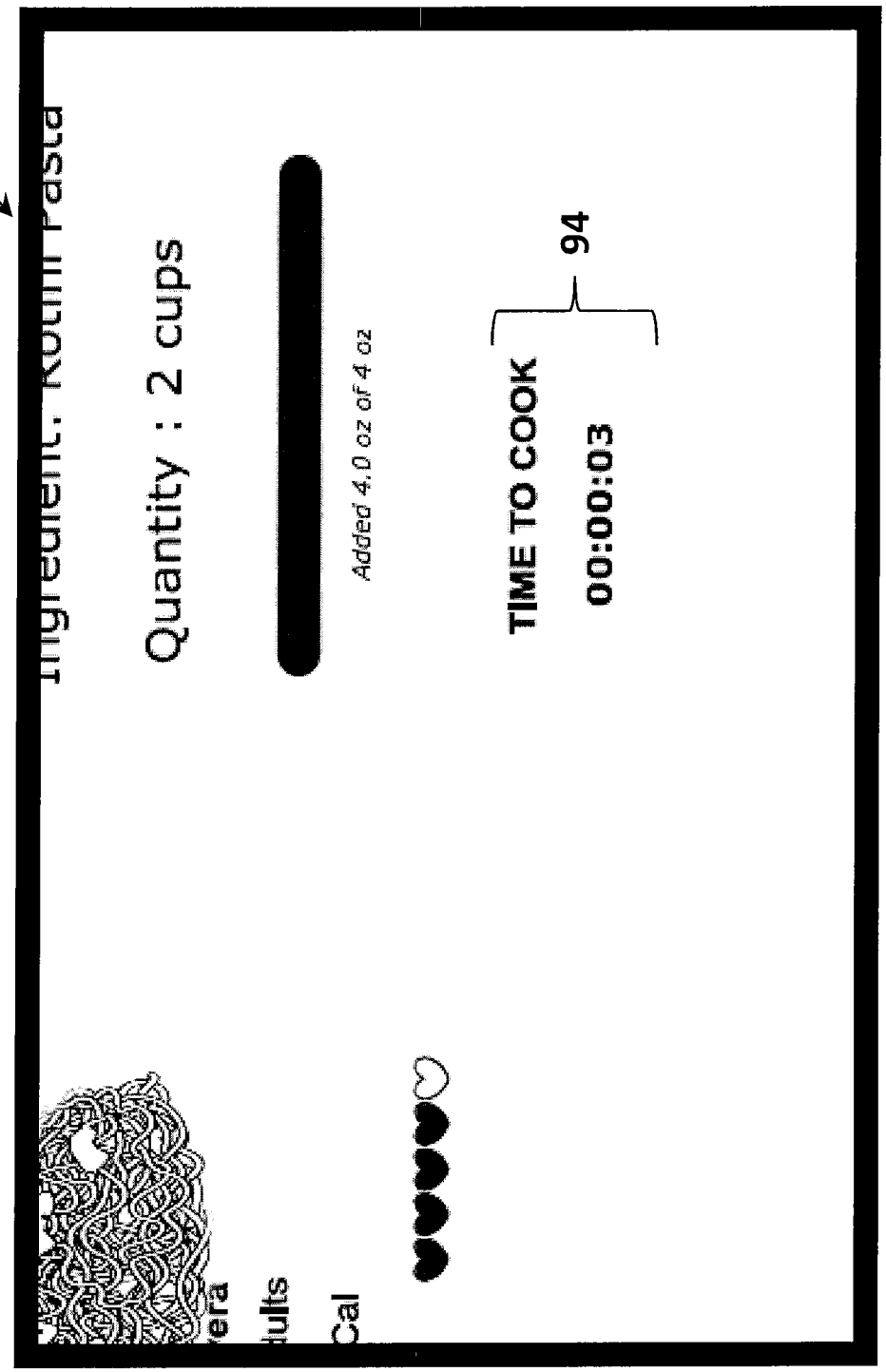
FIG. 24 is a front view of an example of a graphical interface of the electronic device of FIG. 15, illustrating an embodiment of the cook time remaining indicator showing three second remaining.
Figure 25:
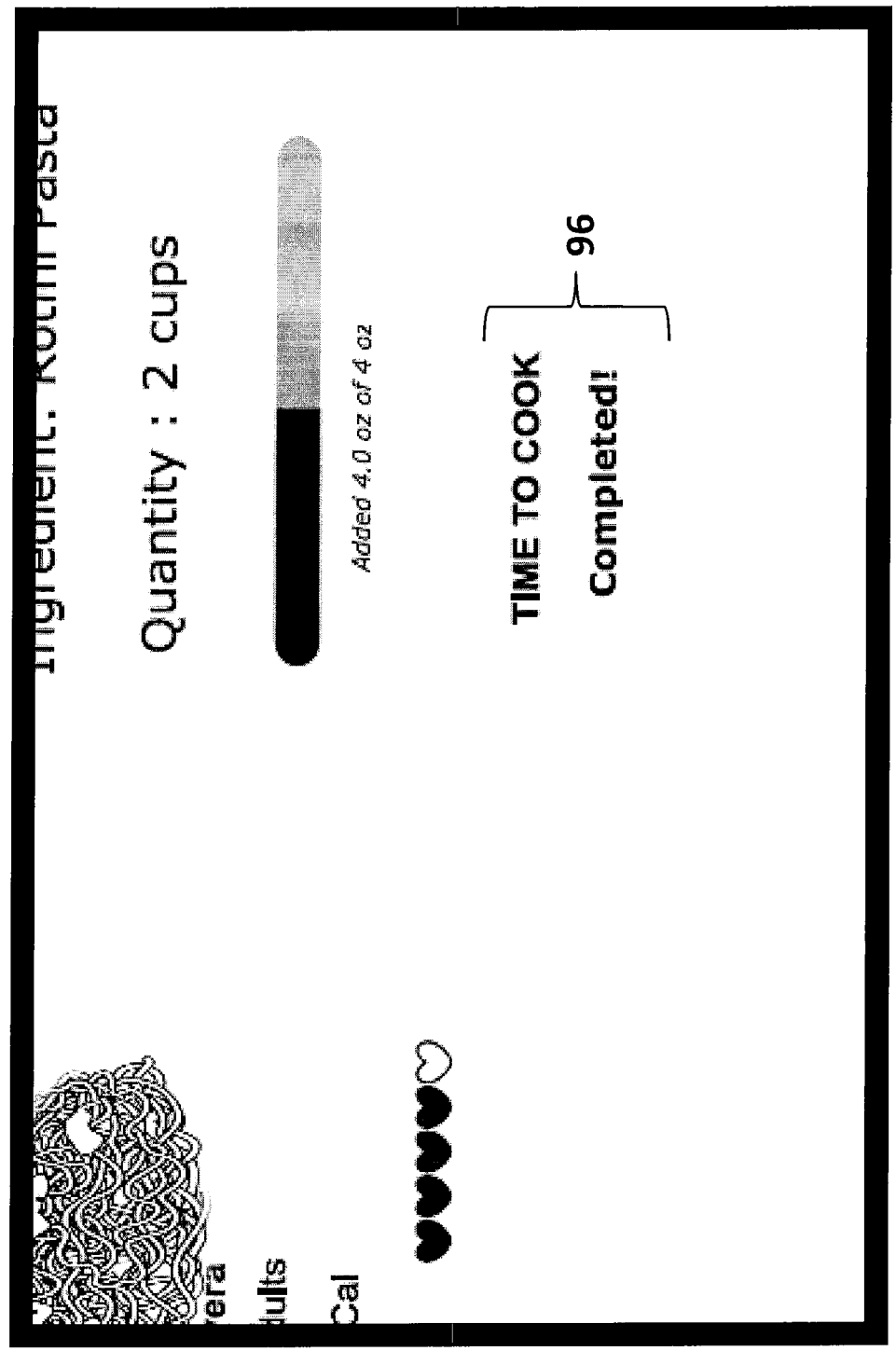
FIG. 25 is a front view of an example of a graphical interface of the electronic device of FIG. 15, illustrating an embodiment of the cook time remaining indicator showing completion.

Throughout the cook mode, the software cooking system displays a cook remaining time indicator 94, such as a count-down clock, as illustrated in FIG. 24. The logic of the software cooking system includes the recipe cook time as a factor and also accounts for decreases and increases in such time due to the changes in the cooking environment sensed by the sensors, such as the actual temperature of the cooking surface 22, the actual weight on the cooking surface 22 and the humidity in the cooking chamber. For example, recipe X may call for a cooking time of ten minutes. The time indicator 94 may start counting down from ten minutes, reaching seven minutes. If the user raises the stovetop heat beyond the recipe temperature, the software cooking system may change the seven minute indication to a five minute indication. This is because the high heat will reduce the time necessary to complete the cooking. The software cooking system periodically (e.g., every fraction of a second such as every two hundred milliseconds, every second or every five seconds) or continuously updates the indicator 94 based on the cooking environmental factors sensed by the sensors of the cooking device 10. When the remaining cooking time has elapsed or expired, the software cooking system displays a cooking completion indicator 96, such as "Completed!" as illustrated in FIG. 25.

Step 6: Post-Cook Mode

Figure 26:
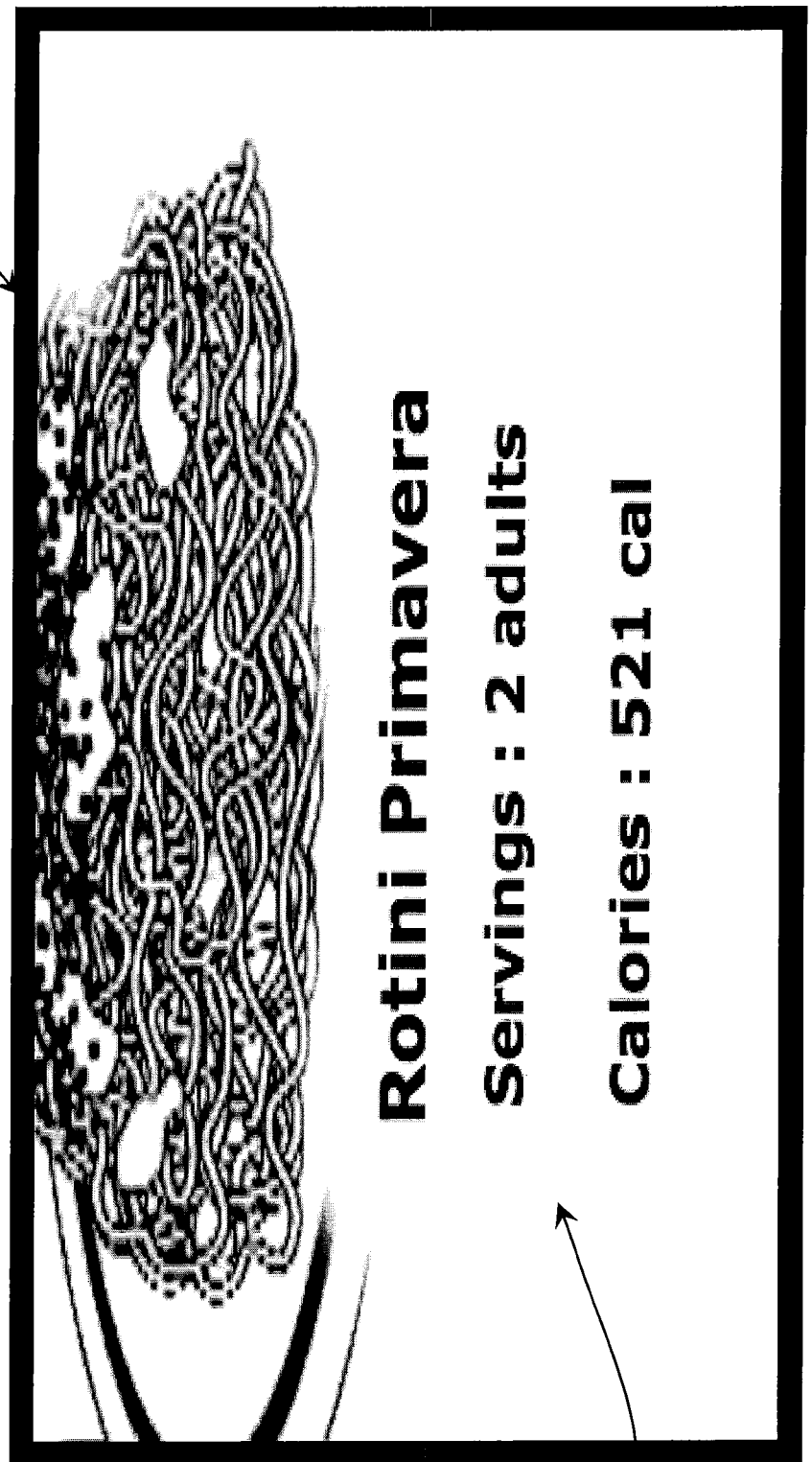
FIG. 26 is a front view of an example of a graphical interface of the electronic device of FIG. 15, illustrating an embodiment of the meal data associated with the meal cooked through the cooking device.

When the cook mode is complete, the software cooking system generates meal data and displays a meal data image 98 associated with the recipe used to cook the meal as illustrated in FIG. 26. In the example illustrated in such figure, the meal data image 98 indicates the generated meal data, including the serving size and the total calories of the meal. As described above, the logic of the software cooking system determines the serving size and total calories depending upon pre-cooking and cooking variables, such as the user's deviation from the recipe's ingredient quantities or cooking temperature.

In an embodiment, the software cooking system enables a user to create a user account and to store his/her historical caloric consumption data. The software cooking system is configured to interface with health, diet and fitness online accounts of users, enabling users to incorporate such caloric data into their health, diet or fitness programs.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A cooking device comprising:
    a base;
    a cooking container comprising a cooking surface coupled to the base so that there is a cavity between the base and the cooking surface, wherein the cooking surface is configured to support a plurality of ingredient portions of an ingredient, wherein the ingredient is associated with an ingredient weight;
    a battery supported by the base;
    a plurality of sensors comprising:
        an ingredient characteristic sensor housed within the cavity, wherein the ingredient characteristic sensor is configured to sense a weight acting on the cooking surface; and
        a cooking environment sensor housed within the cavity, wherein the cooking environment sensor is configured to sense a cooking environment factor;
    a memory device comprising a plurality of computer-readable instructions;
    a data processor operably coupled to the plurality of sensors and the memory device, wherein the data processor is configured to execute the computer-readable instructions to:
        control the ingredient characteristic sensor to sense a weight acting on the cooking surface while the ingredient portions are gradually deposited onto the cooking surface, the weight increasing as more ingredient portions are deposited onto the cooking surface;
        determine whether the weight increases to a level at least as great as the ingredient weight;
        generate a signal depending on the determination, wherein the signal is associated with an output;
        control the cooking environment sensor to sense the cooking environment factor while the ingredient is being cooked, the cooking environment factor being variable during cooking; and
        determine a cooking remaining time depending on a change in one of the cooking environment factor and the weight, wherein the change occurs while the ingredient is being cooked; and
    an antenna supported by the base, the antenna being operably coupled to the data processor, wherein the data processor is configured to execute a plurality of the computer-readable instructions to cause the antenna to transmit the signal and at least one additional signal associated with the cooking remaining time.

2. The cooking device of claim 1, comprising:
    at least one handle supported by the base, wherein the cooking surface is configured to underlie the ingredient portions; and at least one transceiver operably coupled to the data processor, wherein the at least one transceiver comprises the antenna, wherein the output comprises a finish output.

3. The cooking device of claim 1, wherein the ingredient characteristic sensor comprises a load sensor.

4. The cooking device of claim 1, wherein the cooking environment sensor comprises a temperature sensor.

5. The cooking device of claim 4, comprising: (a) a lid configured to cover the cooking surface, the lid defining an inner lid cavity; and (b) a second cooking environment sensor positioned within the inner lid cavity, the second cooking environment sensor comprising a humidity sensor.

6. The cooking device of claim 1, comprising insulation positioned within the cavity, the insulation configured to protect the sensors from heat damage.

7. The cooking device of claim 1, wherein the cooking device comprises a pan, the pan comprising a shape selected from the group consisting of round, partially round, oval, square and rectangular.

8. The cooking device of claim 1, wherein the antenna is configured to transfer data to an electronic device that comprises software, wherein the data causes the electronic device to perform a plurality of steps in accordance with the software, wherein the steps comprise:
displaying an ingredient deposit progress image;
when a first amount of the ingredient portions is deposited onto the cooking surface, causing the ingredient deposit progress image to indicate a first amount of progress toward depositing all of the ingredient portions;
when a second amount of the ingredient portions is deposited onto the cooking surface, causing the ingredient deposit progress image to indicate a second amount of progress toward depositing all of the ingredient portions;
during cooking, indicating whether the cooking environment factor satisfies a designated cooking condition;
indicating the cooking remaining time during the cooking;
indicating a depletion of the cooking remaining time; and
indicating meal data after the depletion of the cooking remaining time, wherein the meal data is associated with the ingredient.

9. A cooking device comprising:
a body configured to contain food, the body comprising a cooking surface, the body defining a cavity located below the cooking surface, wherein the cooking surface is configured to underlie a plurality of ingredient portions of an ingredient that are placed onto the cooking surface, wherein each of the ingredient portions comprises a portion weight, wherein an ingredient weight of the ingredient comprises a sum of the portion weights;
a plurality of sensors comprising:
an ingredient characteristic sensor positioned within the cavity; and
a cooking environment sensor positioned within the cavity;
a data storage device comprising a plurality of instructions;
a data processor operably coupled to the sensors and the data storage device, wherein the data processor is configured to execute the instructions to:
cause the ingredient characteristic sensor to sense a weight acting on the cooking surface while the ingredient portions are incrementally deposited onto the cooking surface;
during the incremental depositing of the ingredient portions, determine whether the weight increases from a first value to a second value, wherein:
the first value is associated with one or more, but less than all, of the portion weights; and
the second value is associated with the ingredient weight;
generate a first signal in response to the weight reaching the second value;
cause the cooking environment sensor to sense a cooking environment factor while the ingredient is being cooked;
determine a cooking remaining time based on a variation in the cooking environment factor that occurs while the ingredient is being cooked; and
generate a second signal associated with the cooking remaining time; and
an antenna supported by the body, the antenna being operably coupled to the data processor, wherein the data processor is configured to execute a plurality of the instructions to cause the antenna to transmit the first and second signals.

10. The cooking device of claim 9, comprising:
a battery supported by the body, wherein the battery is operably coupled to the data processor; and
at least one transceiver operably coupled to the data processor, wherein the at least one transceiver comprises the antenna.

11. The cooking device of claim 10, comprising a handle coupled to the body, the handle housing the battery and data processor.

12. The cooking device of claim 11, wherein the handle comprises a battery recharge port and a plurality of different light sources operable as different status indicators.

13. The cooking device of claim 9, wherein:
the ingredient characteristic sensor comprises a load sensor;
the cooking surface comprises a topside and a bottom side;
the body comprises a base positioned below the cooking surface;
the base defines the cavity;
the base comprises a floor and a weight interface;
the floor and the bottom side of the cooking surface are arranged to be spaced apart from each other so that there is a gap between the floor and the bottom side; and
the weight interface is configured to engage the bottom side of the cooking interface and transfer force from the cooking surface to the load sensor.

14. The cooking device of claim 9, wherein the cooking environment sensor comprises a temperature sensor.

15. The cooking device of claim 9, wherein the data processor is operable with the sensors to generate meal data after the cooking remaining time ends, the meal data depending, at least partially, upon the cooking environment factor.

16. The cooking device of claim 15, wherein the meal data comprises a calorie total of a meal that comprises the ingredient cooked on the cooking surface.

17. An electronic cooking device comprising:
a pan body comprising a cooking surface, wherein the cooking surface is configured to underlie an ingredient, wherein the pan body defines a pan body cavity located below the cooking surface;
one or more sensors positioned within the pan body cavity;

a processor operably coupled to the one or more sensors, wherein:

the processor is programmed to control the one or more sensors to:

sense a weight acting on the cooking surface; and sense a cooking environment factor while the ingredient is being cooked; and the processor is programmed to:

determine at least one change in at least one of the weight and the cooking environment factor while the ingredient is being cooked;

determine a cooking remaining time based on the at least one change; and generate a signal associated with the cooking remaining time; and an antenna supported by the pan body, the antenna being operably coupled to the processor, wherein the processor is programmed to cause the antenna to transmit the signal.

18. The electronic cooking device of claim 17, wherein:
the one or more sensors comprise a load sensor;
the cooking surface comprises a topside and a bottom side;
the pan body comprises a base positioned below the cooking surface;
the base comprises a floor and a weight interface;
the floor and the bottom side of the cooking surface are arranged to be spaced apart from each other; and
the weight interface is configured to engage the bottom side of the cooking interface and transfer force from the cooking surface to the load sensor.

19. The electronic cooking device of claim 17, wherein:
the one or more sensors comprise a temperature sensor; and
the electronic cooking device comprises:
a battery operably coupled to the processor; and
at least one transceiver operably coupled to the processor, wherein the at least one transceiver comprises the antenna.

20. The electronic cooking device of claim 17, wherein the processor is programmed to transfer data to an electronic device comprising a plurality of instructions, wherein the data is configured to cause the electronic device to perform a plurality of steps in accordance with the instructions, wherein the steps comprise:

displaying an ingredient deposit progress image based, at least in part, on the weight;

indicating the cooking remaining time during the cooking;

indicating a depletion of the cooking remaining time; and indicating meal data after the depletion of the cooking remaining time.

21. The electronic cooking device of claim 17, wherein the processor is programmed to transmit one or more signals to an electronic device, wherein the one or more signals are configured to cause the electronic device to perform a plurality of steps, wherein the steps comprise:

indicating the cooking remaining time while the ingredient is being cooked; and indicating meal data after a depletion of the cooking remaining time, wherein the meal data comprises caloric information that depends, at least in part, on the at least one change.

* * * * *